(12) United States Patent
Ono

(10) Patent No.: US 11,593,958 B2
(45) Date of Patent: Feb. 28, 2023

(54) IMAGING DEVICE, DISTANCE MEASUREMENT METHOD, DISTANCE MEASUREMENT PROGRAM, AND RECORDING MEDIUM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 275 days.

(21) Appl. No.: 17/064,580

(22) Filed: Oct. 6, 2020

(65) Prior Publication Data
US 2021/0019899 A1 Jan. 21, 2021

Related U.S. Application Data

(63) Continuation of application No. PCT/JP2019/014757, filed on Apr. 3, 2019.

(30) Foreign Application Priority Data

Apr. 17, 2018 (JP) .............................. JP2018-079173

(51) Int. Cl.
G06T 7/571 (2017.01)
H04N 9/04 (2006.01)
(Continued)

(52) U.S. Cl.
CPC .............. G06T 7/571 (2017.01); G02B 5/201 (2013.01); G02B 27/58 (2013.01); G06T 5/003 (2013.01);
(Continued)

(58) Field of Classification Search
CPC ..... G06T 7/571; G06T 5/003; H04N 9/04559; H04N 5/3696
(Continued)

(56) References Cited

U.S. PATENT DOCUMENTS 4,626,674 A 12/1986 Oinoue
10,785,412 B2 9/2020 Moriuchi et al.
(Continued)

FOREIGN PATENT DOCUMENTS

JP S59146009 8/1984
JP 2006184065 7/2006
(Continued)

OTHER PUBLICATIONS

"International Search Report (Form PCT/ISA/210)" of PCT/JP2019/014757, dated Jun. 18, 2019, with English translation thereof, pp. 1-5.
(Continued)

Primary Examiner — Jeffery A Williams
(74) Attorney, Agent, or Firm — JCIPRNET

(57) ABSTRACT

There are provided an imaging device, a distance measurement method, a distance measurement program, and a recording medium capable of accurately measuring a distance to a subject without depending on a color of the subject.
A bifocal imaging lens, a first pixel and a second pixel that respectively pupil-divide and selectively receive luminous flux incident through a first region of the first region and a second region having different focusing distances of the imaging lens, an image sensor having a third pixel and a fourth pixel corresponding to the second region, a first image acquisition unit (41-1) and a second image acquisition unit (41-2) that acquire a first image and a second image having asymmetric blurs from a first pixel group (22A) and a third pixel group (22C) of the image sensor, a third image acquisition unit (43-1) and a fourth image acquisition unit (43-2) that add pixel values of adjacent pixels of the first and second pixels of the image sensor and add pixel values of adjacent pixels of the third and fourth pixels to acquire a
(Continued)

third image and a fourth image having symmetric blurs, and a distance calculation unit (45) that calculates a distance to a subject in the image based on the acquired first and third images or the acquired second and fourth images are included.

21 Claims, 19 Drawing Sheets

(51) Int. Cl.
| | | |
|---|---|---|
| *G06T 5/00* | (2006.01) | |
| *G02B 5/20* | (2006.01) | |
| *G02B 27/58* | (2006.01) | |
| *G06T 5/20* | (2006.01) | |
| *H04N 5/369* | (2011.01) | |

(52) U.S. Cl.
CPC ............. *G06T 5/20* (2013.01); *H04N 5/3696* (2013.01); *H04N 9/04557* (2018.08)

(58) Field of Classification Search
USPC ......................................................... 348/135
See application file for complete search history.

(56) References Cited

U.S. PATENT DOCUMENTS

| | | |
|---|---|---|
| 2014/0063234 A1 | 3/2014 | Nobayashi |
| 2015/0156478 A1 | 6/2015 | Ono |
| 2016/0094835 A1* | 3/2016 | Takanashi ............ H04N 13/207 |
| | | 348/54 |
| 2017/0054910 A1 | 2/2017 | Moriuchi et al. |
| 2017/0187951 A1 | 6/2017 | Aoki |
| 2018/0061019 A1 | 3/2018 | Wachi |
| 2018/0139378 A1 | 5/2018 | Moriuchi et al. |

FOREIGN PATENT DOCUMENTS

| | | |
|---|---|---|
| JP | 2014048459 | 3/2014 |
| JP | 2017040642 | 2/2017 |
| JP | 2018033126 | 3/2018 |
| JP | 2018077190 | 5/2018 |
| WO | 2014024745 | 2/2014 |
| WO | 2016038936 | 3/2016 |

OTHER PUBLICATIONS

"Written Opinion of the International Searching Authority (Form PCT/ISA/237)" of PCT/JP2019/014757, dated Jun. 18, 2019, with English translation thereof, pp. 1-7.

\* cited by examiner

FIG. 7

| | BLURRED SHAPE (PSF SHAPE) | CORRECTION FILTER REPAIRING ASYMMETRY OF BLUR ($F_A$ TO $F_D$) | ASYMMETRY REPAIRED PSF SHAPE |
|---|---|---|---|
| IMAGE $I_A$ | $B_A$ | $F_{Ai}$ | |
| FIRST SYMMETRIC IMAGE ($I_A + I_B$) | $B_{R1}$ | | |
| IMAGE $I_B$ | $B_B$ | $F_{Bi}$ | |
| IMAGE $I_C$ | $B_C$ | $F_{Ci}$ | |
| SECOND SYMMETRIC IMAGE ($I_C + I_D$) | $B_{R2}$ | | |
| IMAGE $I_D$ | $B_D$ | $F_{Di}$ | |

IMAGING DEVICE, DISTANCE MEASUREMENT METHOD, DISTANCE MEASUREMENT PROGRAM, AND RECORDING MEDIUM

CROSS-REFERENCE TO RELATED APPLICATIONS

The present application is a Continuation of PCT International Application No. PCT/JP2019/014757 filed on Apr. 3, 2019 claiming priority under 35 U.S.C. § 119(a) to Japanese Patent Application No. 2018-079173 filed on Apr. 17, 2018. Each of the above applications is hereby expressly incorporated by reference, in its entirety, into the present application.

BACKGROUND OF THE INVENTION

1. Field of the Invention

The present invention relates to an imaging device, a distance measurement method, a distance measurement program, and a recording medium, and more particularly to a technique for accurately measuring a distance to a subject.

2. Description of the Related Art

In recent years, an imaging device that measures a distance between multiple viewpoint images has been proposed (JP2017-040642A).

The imaging device described in JP2017-040642A measures a distance to a subject by color aperture imaging and has an imaging lens 1 provided with color correction filters CC-Y and CC-C, and an image sensor 2 as shown in FIG. 20.

The color correction filters CC-Y and CC-C are filters for yellow (Y) and cyan (C), respectively, and are provided in regions that divide the imaging lens 1 into two parts of left and right as shown in FIG. 21. The color correction filter CC-Y transmits light in R and G wavelength bands of the red (R), green (G), and blue (B) wavelength bands, and attenuates the B wavelength band. The color correction filter CC-C transmits light in the B and G wavelength bands of the R, G, and B wavelength bands, and attenuates light in the R wavelength band.

The image sensor 2 is a normal color image sensor in which R, G, and B color filters are disposed for each pixel.

A principle of distance measurement according to the invention described in JP2017-040642A is as follows.

As shown in FIG. 20, light emitted from one point of a subject 3 is incident on the image sensor 2 through the imaging lens 1. In the example shown in FIG. 20, a distance to the subject 3 is shorter than a focusing distance of the imaging lens 1 (front focus). Therefore, the light emitted from the one point is incident on the image sensor 2 as a circular blurred image 4.

As modeled in FIG. 21, a slit-shaped input image is incident on the image sensor 2 through the imaging lens 1 having the color correction filters CC-Y and CC-C. The input image is imaged as a blurred image in a case where a distance to the input image is different from a focusing distance of the imaging lens 1.

A blurred image output from the pixel (R pixel) in which the R color filter of the image sensor 2 is disposed is imaged as a blur having an asymmetric shape (asymmetric blur) due to a region where the light in the B wavelength band is attenuated by the color correction filter CC-Y and a region where the light in the B wavelength band is not attenuated by the color correction filter CC-C. A blurred image output from the pixel (B pixel) in which the B color filter of the image sensor 2 is disposed is imaged as a blur having an asymmetric shape (asymmetric blur) due to a region where the light in the R wavelength band is not attenuated by the color correction filter CC-Y and a region where the light in the R wavelength band is attenuated by the color correction filter CC-C.

On the other hand, a blurred image output from the pixel (G pixel) in which the G color filter of the image sensor 2 is disposed is imaged as a blur having a symmetric shape (symmetric blur) since the light in the G wavelength band is not attenuated by the color correction filters CC-Y and CC-C.

In the invention described in JP2017-040642A, a distance to the subject appearing in the image is calculated according to a correlation between a target image in which a blur function is represented non point-symmetrically (for example, image obtained from R pixel which is asymmetric blur) and a reference image in which a blur function is represented point-symmetrically (for example, image obtained from G pixel which is symmetric blur).

Specifically, the target image having the asymmetric blur is subjected to a correction filter for repairing to the symmetric blur, and a correction filter (blur correction kernel) in a case where the correlation between the blurred shape of the repaired target image and the blurred shape of the reference image having the symmetric blur is maximized is obtained to calculate the distance to the subject appearing in the image.

SUMMARY OF THE INVENTION

A normal image sensor may be used as the imaging device described in JP2017-040642A, but the color correction filters CC-Y and CC-C needs to be installed in the imaging lens. The distance to the subject is measured based on the blurred shapes between the image (image having asymmetric blur) obtained from the R pixel or B pixel of the image sensor and the image (image having symmetric blur) obtained from the G pixel of the image sensor. Therefore, there is a problem that measurement accuracy in the distance to a colored object is low and measures are to be taken.

The present invention has been made in view of such circumstances and provides an imaging device, a distance measurement method, a distance measurement program, and a recording medium capable of accurately measuring a distance to a subject without depending on a color of the subject.

An imaging device according to an aspect of the present invention comprises a multifocal imaging lens having different focusing distances in a first region and a second region, an image sensor having a plurality of pixels formed of photoelectric conversion elements arranged two-dimensionally and having a first pixel and a second pixel that respectively pupil-divide and selectively receive luminous flux incident through the first region of the imaging lens and a third pixel and a fourth pixel that respectively pupil-divide and selectively receive luminous flux incident through the second region of the imaging lens, a first image acquisition unit that acquires a first image having an asymmetric blur from at least one pixel of the first pixel or the second pixel of the image sensor, a second image acquisition unit that acquires a second image having an asymmetric blur from at least one pixel of the third pixel or the fourth pixel of the image sensor, a third image acquisition unit that adds pixel values of adjacent pixels of the first pixel and the second pixel of the image sensor to acquire a third image having a symmetric blur, a fourth image acquisition unit that adds pixel values of adjacent pixels of the third pixel and the fourth pixel of the image sensor to acquire a fourth image having a symmetric blur, a first distance calculation unit that calculates a distance to a subject in an image based on the acquired first image and third image, and a second distance calculation unit that calculates a distance to a subject in an image based on the acquired second image and fourth image.

According to one aspect of the present invention, a multifocal imaging lens having different focusing distances in the first region and the second region is used as the imaging lens. The image sensor has directivity by a pupil division unit, and has the first and second pixels that respectively pupil-divide and selectively receive luminous flux incident through the first region of the imaging lens and the third and fourth pixels that respectively pupil-divide and selectively receive luminous flux incident through the second region of the imaging lens. The first image having the asymmetric blur is acquired from at least one pixel of the first pixel and the second pixel corresponding to a pair of phase difference pixels from the image sensor, and the pixel values of the adjacent pixels of the first pixel and the second pixel are added to acquire the second image having the symmetric blur. The third image having the asymmetric blur is acquired from at least one pixel of the third pixel and the fourth pixel corresponding to a pair of phase difference pixels, and the pixel values of the adjacent pixels of the third pixel and the fourth pixel are added to acquire the fourth image having the symmetric blur. The distance to the subject in the image is calculated based on the acquired first and third images, and similarly, the distance to the subject in the image is calculated based on the second and fourth images. The first and second pixels and the third and fourth pixels, which correspond to the pair of phase difference pixels, generally have color filters of the same color (including white). Therefore, the first and third images and the second and fourth images have the blurred shape that does not depend on the color of the subject, and thus it is possible to accurately measure the distance to the subject without depending on the color of the subject. Further, the first and third images and the second and fourth images are images passing through the regions having different focusing distances in the multifocal imaging lens. Therefore, it is possible to widen the measurement range of the distance to the subject with high accuracy as compared with an imaging lens having one focusing distance.

An imaging device according to another aspect of the present invention comprises a multifocal imaging lens having different focusing distances in a first region and a second region, an image sensor having a plurality of pixels formed of photoelectric conversion elements arranged two-dimensionally and having a first pixel that pupil-divides and receives luminous flux incident through the first region of the imaging lens, a third pixel that pupil-divides and receives luminous flux incident through the second region of the imaging lens, a first reference pixel that does not pupil-divide and receives luminous flux incident through the first region of the imaging lens, and a second reference pixel that does not pupil-divide and receives luminous flux incident through the second region of the imaging lens, a first image acquisition unit that acquires a first image having an asymmetric blur from the first pixel of the image sensor, a second image acquisition unit that acquires a second image having an asymmetric blur from the third pixel of the image sensor, a third image acquisition unit that acquires a third image having a symmetric blur from the first reference pixel of the image sensor, a fourth image acquisition unit that acquires a fourth image having a symmetric blur from the second reference pixel of the image sensor, a first distance calculation unit that calculates a distance to a subject in an image based on the acquired first image and third image, and a second distance calculation unit that calculates a distance to a subject in an image based on the acquired second image and fourth image.

In the imaging device according to another aspect of the present invention, the image sensor is different from the image sensor of the imaging device according to the one aspect of the present invention in that the image sensor has the first pixel that pupil-divides and receives luminous flux incident through the first region of the imaging lens, the third pixel that pupil-divides and receives luminous flux incident through the second region of the imaging lens, the first reference pixel that does not pupil-divide and receives luminous flux incident through the first region of the imaging lens, and the second reference pixel that does not pupil-divide and receives luminous flux incident through the second region of the imaging lens. With this image sensor, it is possible to acquire the second image and the fourth image having the symmetric blurs from the first reference pixel and the second reference pixel. Therefore, the other aspect of the present invention is different from the one aspect of the present invention in that it is not necessary to add the first and second pixels corresponding to the pair of phase difference pixels to acquire the third image having the symmetric blur and to the second and fourth pixels to acquire the fourth image having the symmetric blur as in the one aspect of the present invention, but the other points are common.

In the imaging device according to still another aspect of the present invention, it is preferable that the image sensor has a second pixel that pupil-divides and receives luminous flux incident through the first region of the imaging lens and has a pupil division direction different from that of the first pixel, and a fourth pixel that pupil-divides and receives luminous flux incident through the second region of the imaging lens and has a pupil division direction different from that of the third pixel. That is, it is preferable that the image sensor having the first reference pixel and the second reference pixel has the second pixel having the different pupil division direction in addition to the first pixel and has the fourth pixel having the different pupil division direction from the third pixel.

In the imaging device according to still another aspect of the present invention, the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and, in the image sensor, one microlens is disposed in four of the first pixel, the second pixel, the third pixel, and the fourth pixel which are adjacent to each other in the first direction and the second direction of the imaging lens, and luminous flux incident through the first sub-region, the second sub-region, the third sub-region, and the fourth sub-region of the imaging lens is pupil-divided by the microlens and is incident on the first pixel, the second pixel, the third pixel, and the fourth pixel. That is, the luminous flux incident on each microlens through the imaging lens having the first region consisting of the first sub-region and the second sub-region and the second region consisting of the third sub-region and the fourth sub-region is pupil-divided by each microlens and is incident on the first and second pixels, and the third and fourth pixels.

In the imaging device according to still another aspect of the present invention, the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and, in the image sensor, four kinds of light-shielding masks for pupil division that form a first aperture, a second aperture, a third aperture, and a fourth aperture respectively having different aperture positions are provided in the first pixel, the second pixel, the third pixel, and the fourth pixel, and luminous flux incident through the first sub-region, the second sub-region, the third sub-region, and the fourth sub-region of the imaging lens is pupil-divided by the light-shielding masks and is incident on the first pixel, the second pixel, the third pixel, and the fourth pixel. That is, the luminous flux incident on the first pixel, the second pixel, the third pixel, and the fourth pixel through the imaging lens having the first region consisting of the first sub-region and the second sub-region and the second region consisting of the third sub-region and the fourth sub-region is pupil-divided by the four kinds of light-shielding masks for pupil division (four kinds of light-shielding masks having the first aperture, the second aperture, the third aperture, and the fourth aperture respectively having different aperture positions) respectively provided in the first pixel, the second pixel, the third pixel, and the fourth pixel and is received by the first pixel, the second pixel, the third pixel, and the fourth pixel.

In the imaging device according to still another aspect of the present invention, the imaging lens has the first region consisting of a central optical system and the second region consisting of an annular optical system in a peripheral portion of the central optical system, which are respectively disposed on the same optical axis, and, in the image sensor, four kinds of light-shielding masks for pupil division that form a first aperture, a second aperture, a third aperture, and a fourth aperture respectively having different aperture positions and shapes are provided in the first pixel, the second pixel, the third pixel, and the fourth pixel, and luminous flux incident through the central optical system of the imaging lens is pupil-divided by the light-shielding masks and is incident on the first pixel and the second pixel and luminous flux incident through the annular optical system of the imaging lens is pupil-divided by the light-shielding masks and is incident on the third pixel and the fourth pixel.

In the imaging device according to still another aspect of the present invention, it is preferable that a plurality of color filters including three color filters of three primary colors are disposed in a predetermined filter array in each pixel of the plurality of pixels of the image sensor, and the first image and the second image acquired by the first image acquisition unit and the second image acquisition unit and the third image and the fourth image acquired by the third image acquisition unit and the fourth image acquisition unit are images acquired from pixels in which the color filters of the same color are disposed, respectively. Accordingly, the shapes of the asymmetric blurs of the first image and the second image and the shapes of the symmetric blurs of the third image and the fourth image do not change depending on the color of the subject, and thus it is possible to measure the distance that does not depend on the color of the subject.

In the imaging device according to still another aspect of the present invention, it is preferable that the first distance calculation unit includes a first filter processing unit that corrects an asymmetric blur of a first local image in a local region of the first image to a symmetric blur using a first correction filter and a first correction filter search unit that compares the first local image corrected by the first correction filter with a third local image in a local region of the third image, which is in the same local region as the first local image, to search for the first correction filter in a case where a correlation between the compared first local image and third local image is maximized, and calculates a distance of the local region which is the distance to the subject based on the searched first correction filter, and the second distance calculation unit includes a second filter processing unit that corrects an asymmetric blur of a second local image in a local region of the second image to a symmetric blur using a second correction filter and a second correction filter search unit that compares the second local image corrected by the second correction filter with a fourth local image in a local region of the fourth image, which is in the same local region as the second local image, to search for the second correction filter in a case where a correlation between the compared second local image and fourth local image is maximized, and calculates a distance of the local region which is the distance to the subject based on the searched second correction filter. The first correction filter that corrects the asymmetric blur of the first local image and maximizes the correlation with the third local image having the symmetric blur corresponds to the size and shape of the asymmetric blur of the first local image (distance of the first local image). Therefore, it is possible to calculate the distance of the first local image using the searched first correction filter by searching for the first correction filter that maximizes the correlation between the corrected first local image and the third local image. Similarly, the second correction filter that corrects the asymmetric blur of the second local image and maximizes the correlation with the fourth local image having the symmetric blur corresponds to the size and shape of the asymmetric blur of the second local image (distance of the second local image). Therefore, it is possible to calculate the distance of the second local image using the searched second correction filter by searching for the second correction filter that maximizes the correlation between the corrected second local image and the fourth local image.

In the imaging device according to still another aspect of the present invention, it is preferable that the first distance calculation unit includes a first correction filter storage unit that stores a plurality of the first correction filters having different filter sizes and filter coefficients according to the distance to the subject, the first filter processing unit reads one first correction filter of the plurality of first correction filters stored in the first correction filter storage unit and performs a convolution operation between the first local image and the read first correction filter to generate the first local image corrected by the first correction filter, the first correction filter search unit searches for the first correction filter in a case where the correlation is maximized from among the plurality of first correction filters stored in the first correction filter storage unit, the second distance calculation unit includes a second correction filter storage unit that stores a plurality of the second correction filters having different filter sizes and filter coefficients according to the distance to the subject, the second filter processing unit reads one second correction filter of the plurality of second correction filters stored in the second correction filter storage unit and performs a convolution operation between the second local image and the read second correction filter to generate the second local image corrected by the second correction filter, and the second correction filter search unit searches for the second correction filter in a case where the correlation is maximized from among the plurality of second correction filters stored in the second correction filter storage unit.

The sizes and shapes of the asymmetric blurs of the first and second local images are different according to the distance to the subject. Therefore, the filter sizes and the filter coefficients of the first and second correction filters for correcting the first and second local images having the asymmetric blurs to the symmetric blurs also differ according to the distance to the subject. Therefore, the plurality of first and second correction filters having different filter sizes and filter coefficients according to the distance to the subject are stored in the first and second correction filter storage units and the first and second correction filters that appropriately correct the symmetric blurs of the first and second local images are searched from the plurality of stored first and second correction filters stored in the first and second correction filter storage units to calculate the distance between the first and second local images using the searched first and second correction filters. Although the convolution operation between the first and second local images having the asymmetric blurs and the first and second correction filters read from the first and second correction filter storage units is performed to correct the blurred shapes of the first and second local images, it is possible to calculate the distance between the first and second local images using the searched first and second correction filters by searching for the first and second correction filters in the case where the correlation between the first and second local images with the corrected blurred shapes and the third and fourth local images having the symmetric blurs is maximized.

The imaging device according to still another aspect of the present invention preferably further comprises a selection unit that selects one distance to the subject of the distance to the subject calculated by the first distance calculation unit and the distance to the subject calculated by the second distance calculation unit, as a distance to the subject in the image. For example, it is possible to divide and select the first correction filter and the second correction filter that are searchable according to the distance to the subject, such that the distance to the subject calculated by the first distance calculation unit and the distance to the subject calculated by the second distance calculation unit do not overlap.

In the imaging device according to still another aspect of the present invention, it is preferable that an apodizing filter that continuously changes light transmittance from an optical axis center of the imaging lens toward a peripheral portion is provided. It is possible to smoothly change the blurred shapes of the first and second images having the asymmetric blurs and of the third and fourth images having the symmetric blurs using the apodizing filter. Accordingly, it is possible to respectively clarify the asymmetry of the asymmetric blurs of the first and second images and the symmetry of the symmetric blurs of the third and fourth images and thus to further improve the accuracy of the distance measurement.

An invention according to still another aspect is a distance measurement method by an imaging device including a multifocal imaging lens having different focusing distances in a first region and a second region and an image sensor having a plurality of pixels formed of photoelectric conversion elements arranged two-dimensionally and having a first pixel and a second pixel that respectively pupil-divide and selectively receive luminous flux incident through the first region of the imaging lens and a third pixel and a fourth pixel that respectively pupil-divide and selectively receive luminous flux incident through the second region of the imaging lens, and includes a step of acquiring a first image having an asymmetric blur from at least one pixel of the first pixel or the second pixel of the image sensor, a step of acquiring a second image having an asymmetric blur from at least one pixel of the third pixel or the fourth pixel of the image sensor, a step of adding pixel values of adjacent pixels of the first pixel and the second pixel of the image sensor to acquire a third image having a symmetric blur, a step of adding pixel values of adjacent pixels of the third pixel and the fourth pixel of the image sensor to acquire a fourth image having a symmetric blur, a first distance calculation step of calculating a distance to a subject in an image based on the acquired first image and third image, and a second distance calculation step of calculating a distance to a subject in an image based on the acquired second image and fourth image.

An invention according to still another aspect is a distance measurement method by an imaging device including a multifocal imaging lens having different focusing distances in a first region and a second region and an image sensor having a plurality of pixels formed of photoelectric conversion elements arranged two-dimensionally and having a first pixel that pupil-divides and receives luminous flux incident through the first region of the imaging lens, a third pixel that pupil-divides and receives luminous flux incident through the second region of the imaging lens, a first reference pixel that does not pupil-divide and receives luminous flux incident through the first region of the imaging lens, and a second reference pixel that does not pupil-divide and receives luminous flux incident through the second region of the imaging lens, and includes a step of acquiring a first image having an asymmetric blur from the first pixel of the image sensor, a step of acquiring a second image having an asymmetric blur from the third pixel of the image sensor, a step of acquiring a third image having a symmetric blur from the first reference pixel of the image sensor, a step of acquiring a fourth image having a symmetric blur from the second reference pixel of the image sensor, a first distance calculation step of calculating a distance to a subject in an image based on the acquired first image and third image, and a second distance calculation step of calculating a distance to a subject in an image based on the acquired second image and fourth image.

In the distance measurement method according to still another aspect of the present invention, the first distance calculation step includes a step of correcting an asymmetric blur of a first local image in a local region of the first image to a symmetric blur using a first correction filter and a first search step of comparing the first local image corrected by the first correction filter with a third local image in a local region of the third image, which is in the same local region as the first local image, to search for the first correction filter in a case where a correlation between the compared first local image and third local image is maximized, and calculates a distance of the local region which is the distance to the subject based on the searched first correction filter, and the second distance calculation step includes a step of correcting an asymmetric blur of a second local image in a local region of the second image to a symmetric blur using a second correction filter and a second search step of comparing the second local image corrected by the second correction filter with a fourth local image in a local region of the fourth image, which is in the same local region as the second local image, to search for the second correction filter in a case where a correlation between the compared second local image and fourth local image is maximized, and calculates a distance of the local region which is the distance to the subject based on the searched second correction filter.

In the distance measurement method according to still another aspect of the present invention, it is preferable that the first distance calculation step reads one first correction filter of the plurality of first correction filters from a first correction filter storage unit that stores a plurality of the first correction filters having different filter sizes and filter coefficients according to the distance to the subject and performs a convolution operation between the first local image and the read first correction filter to generate the first local image corrected by the first correction filter, the first search step searches for the first correction filter in a case where the correlation is maximized from among the plurality of first correction filters stored in the first correction filter storage unit, the second distance calculation step reads one second correction filter of the plurality of second correction filters from a second correction filter storage unit that stores a plurality of the second correction filters having different filter sizes and filter coefficients according to the distance to the subject and performs a convolution operation between the second local image and the read second correction filter to generate the second local image corrected by the second correction filter, and the second search step searches for the second correction filter in a case where the correlation is maximized from among the plurality of second correction filters stored in the second correction filter storage unit.

A distance measurement program according to still another aspect of the present invention causes a computer to execute the above distance measurement method.

A recording medium according to still another aspect of the present invention is a recording medium in which the distance measurement program causing the computer to execute the above distance measurement method is recorded.

According to the present invention, it is possible to accurately measure the distance to the subject without depending on the color of the subject.

BRIEF DESCRIPTION OF THE DRAWINGS

FIG. 7 is a schematic diagram showing blurred shapes (PSF shapes) of images $I_A$, $I_B$, $I_C$, $I_D$, a first symmetric image ($I_A+I_B$), and a second symmetric image ($I_C+I_D$), and shapes of correction filters $F_{Ai}$, $F_{Bi}$, $F_{Ci}$, and $F_{Di}$ applied to the images $I_A$, $I_B$, $I_C$, $I_D$.

DESCRIPTION OF THE PREFERRED EMBODIMENTS

Hereinafter, preferred embodiments of an imaging device, a distance measurement method, a distance measurement program, and a recording medium according to the present invention will be described below with reference to accompanying drawings.

[Appearance of Imaging Device]

Figure 1:
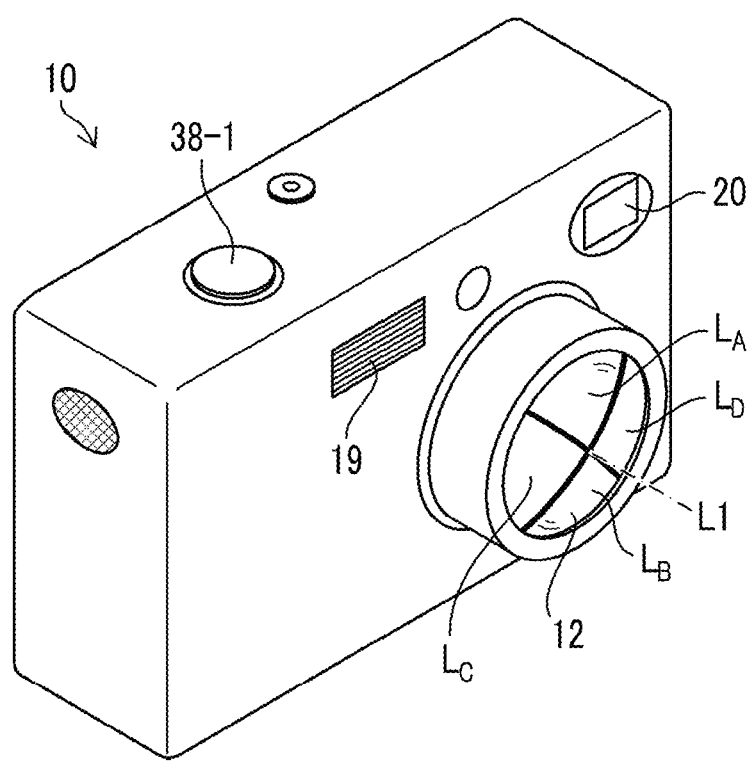
FIG. 1 is an external perspective view of an imaging device according to a first embodiment of the present invention.

FIG. 1 is an external perspective view of an imaging device according to a first embodiment of the present invention. As shown in FIG. 1, an imaging lens 12, a flash light emitting unit 19, a viewfinder window 20 of an optical viewfinder, and the like are disposed on a front surface of an imaging device 10, and a shutter button 38-1 is provided on an upper surface thereof. In FIG. 1, L1 represents an optical axis of the imaging lens 12.

[Internal Configuration of Imaging Device]

Figure 2:
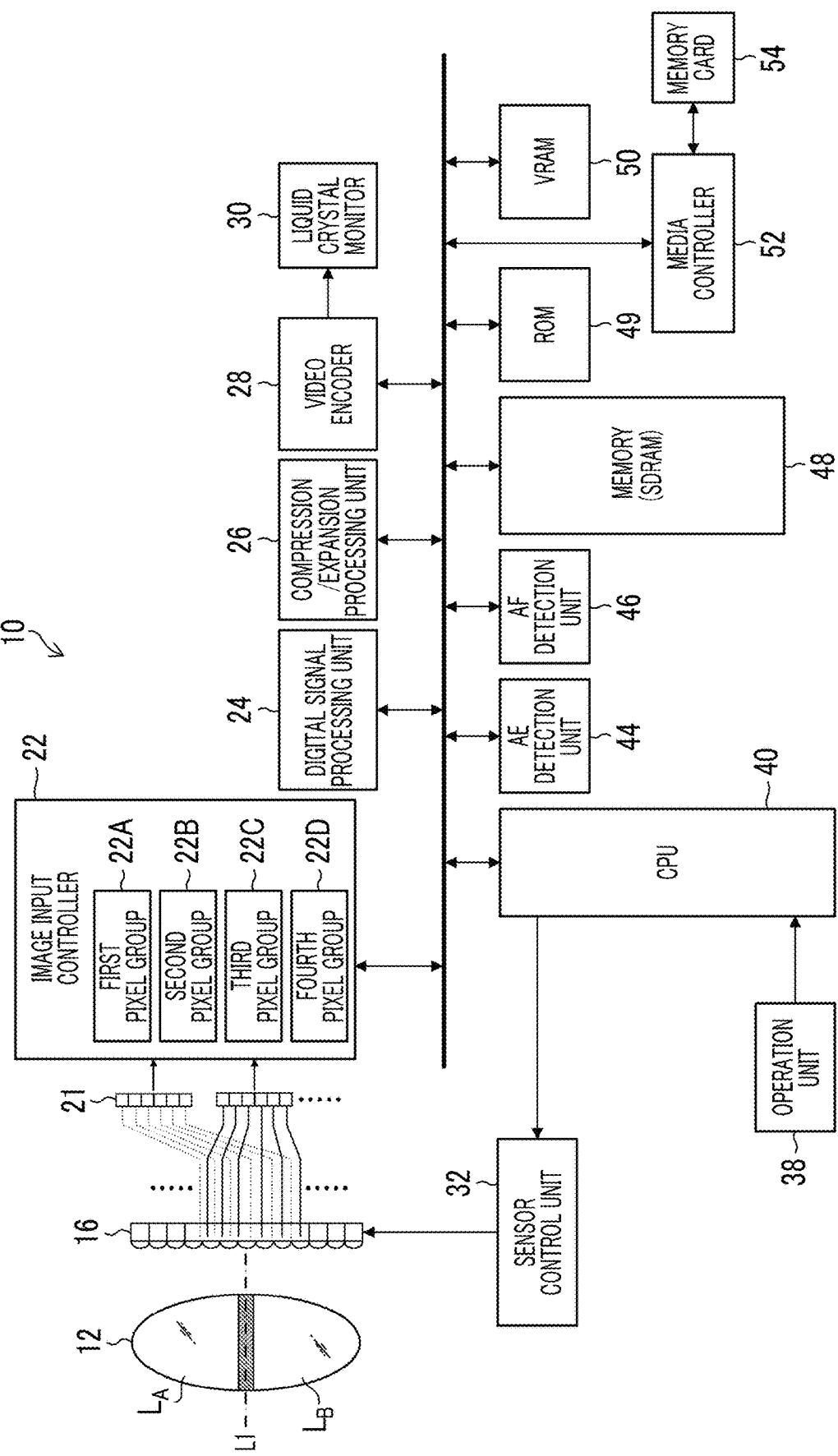
FIG. 2 is a block diagram showing an embodiment of an internal configuration of an imaging device 10 shown in FIG. 1.

FIG. 2 is a block diagram showing an embodiment of an internal configuration of the imaging device 10 shown in FIG. 1.

The imaging device 10 records a captured image on a memory card 54 in association with a distance map indicating a distance to a subject in the image and a distance distribution of the subject in an imaging scene (imaging range) and is characterized by a distance measurement unit that measures the distance to the subject.

As shown in FIG. 2, the imaging device 10 is mainly configured of the imaging lens 12, an image sensor 16, an image input controller 22, a digital signal processing unit 24, a compression/expansion processing unit 26, a video encoder 28, a liquid crystal monitor 30, a sensor control unit 32, an operation unit 38, a central processing unit (CPU) 40, an automatic exposure (AE) detection unit 44, an auto focus (AF) detection unit 46, a synchronous dynamic random access memory (SDRAM) 48, a read only memory (ROM) 49, a video random access memory (VRAM) 50, a media controller 52, and the like.

<First Embodiment of Imaging Lens>

Figure 3:
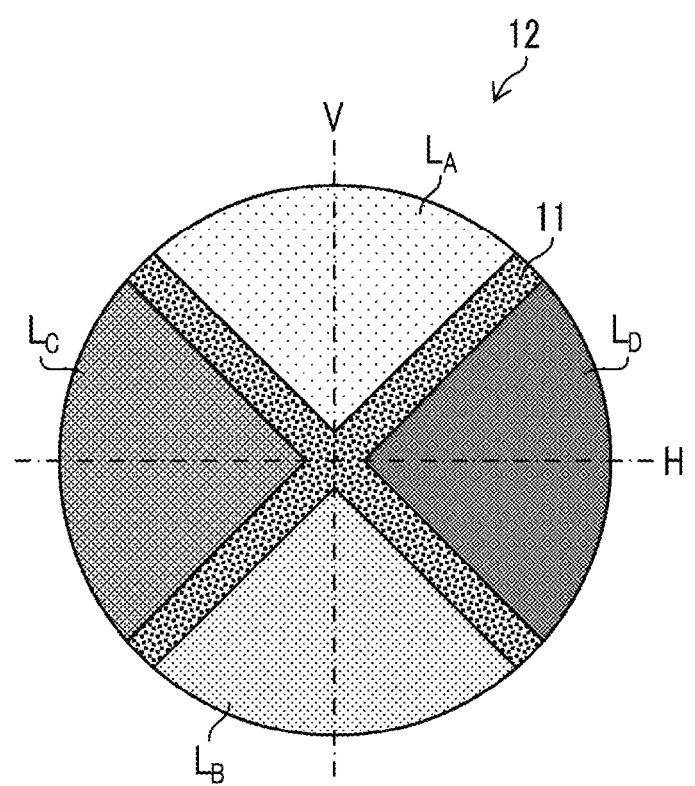
FIG. 3 is a front view of a first embodiment of an imaging lens 12.

FIG. 3 is a front view of a first embodiment of the imaging lens 12.

The imaging lens 12 shown in FIG. 3 is a multifocal (bifocal in this example) imaging lens and has a first region consisting of point-symmetrical first sub-region $L_A$ and second sub-region $L_B$ that are divided in a first direction (vertical direction) of the imaging lens 12 and a second region consisting of point-symmetrical third sub-region $L_C$ and fourth sub-region $L_D$ that are divided in a second direction (horizontal direction) orthogonal to the first direction of the imaging lens 12.

A light shielding portion 11 is provided between the first sub-region $L_A$, the second sub-region $L_B$, the third sub-region $L_C$, and the fourth sub-region $L_D$ such that light is not mixed between the regions.

The first region consisting of the first sub-region $L_A$ and the second sub-region $L_B$ in the vertical direction (V direction) of the imaging lens 12 has a different focusing distance from that of the second region consisting of the third sub-region $L_C$ and fourth sub-region $L_D$ in the horizontal direction (H direction), and in this example, the first region has a longer focusing distance than the second region.

<First Embodiment of Image Sensor>

The image sensor 16 according to the first embodiment is configured of a complementary metal-oxide semiconductor (CMOS) type color image sensor. The image sensor 16 is not limited to the CMOS type, but may be an XY address type or a charge coupled device (CCD) type image sensor.

Figure 4:
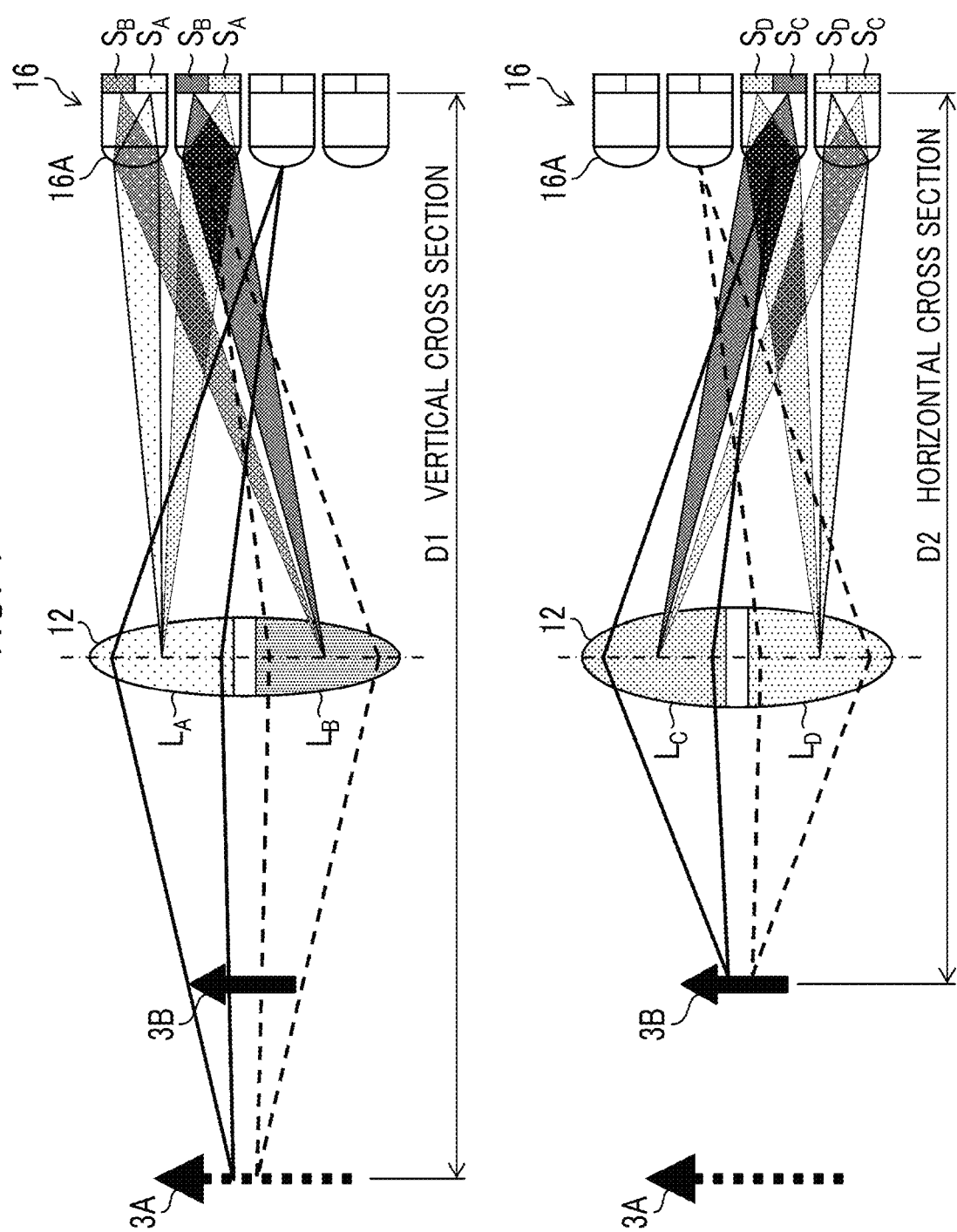
FIG. 4 is an enlarged view of an essential part mainly showing an action of the imaging lens 12 and an image sensor 16.

FIG. 4 is an enlarged view of an essential part mainly showing an action of the imaging lens 12 and the image sensor 16. The focusing distance of the first region consisting of the first sub-region $L_A$ and the second sub-region $L_B$ of the imaging lens 12 appearing in a vertical cross section of the imaging lens 12 corresponds to a subject distance D1 of a subject 3A, and the focusing distance of the second region consisting of the third sub-region $L_C$ and the fourth sub-region $L_D$ of the imaging lens 12 appearing in a horizontal cross section of the imaging lens 12 corresponds to a subject distance D2 of a subject 3B.

Figure 5:
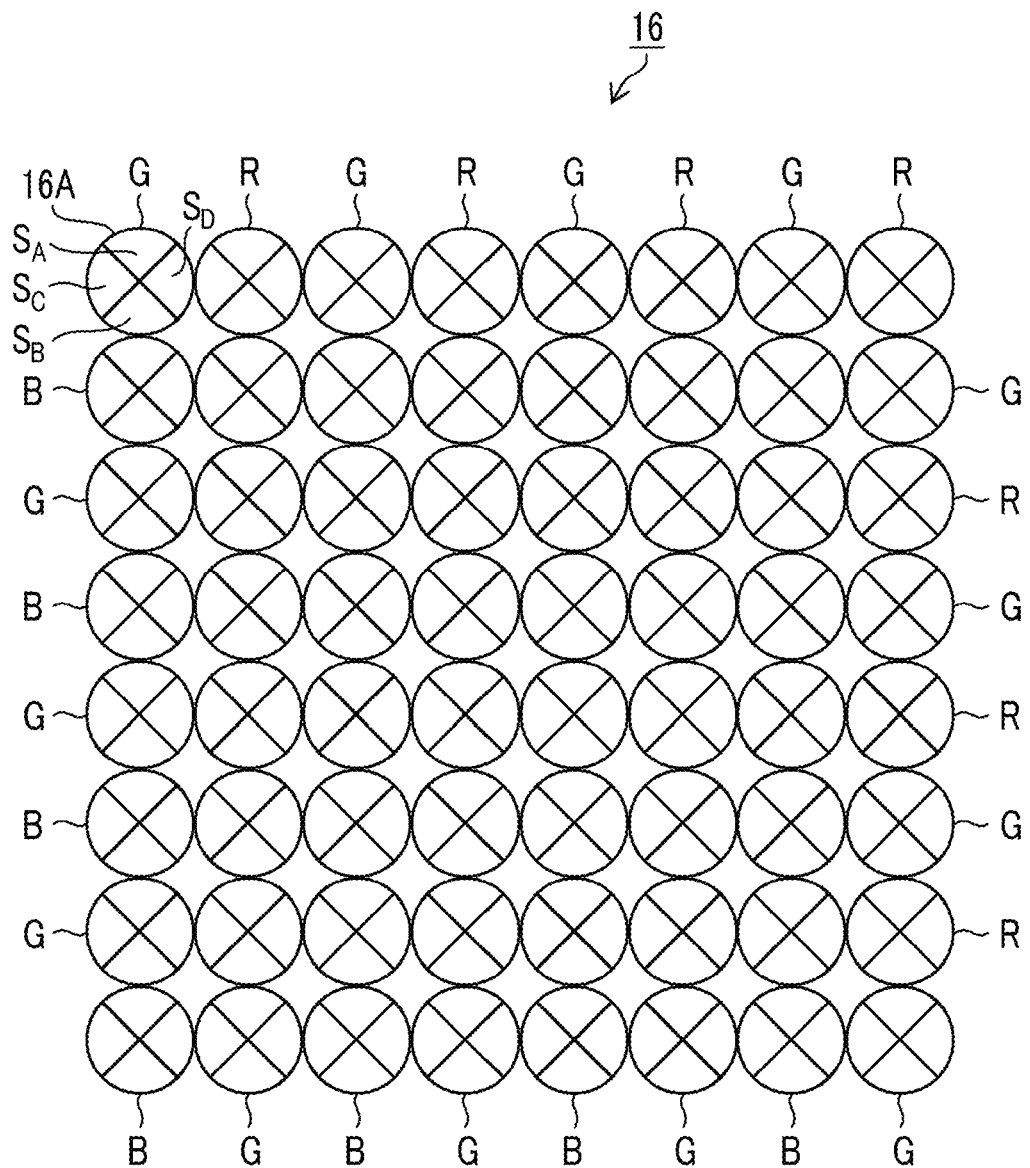
FIG. 5 is a front view of the image sensor 16.

FIG. 5 is a front view of the image sensor 16.

As shown in FIG. 5, the image sensor 16 is an image sensor having a plurality of pixels formed of photoelectric conversion elements (light receiving cells) arranged two-dimensionally in a horizontal direction (x direction) and a vertical direction (y direction), and is configured of including a first pixel $S_A$, a second pixel $S_B$, a third pixel $S_C$, and a fourth pixel $S_D$ that pupil-divide a luminous flux incident through the imaging lens 12 by a pupil division unit described below to selectively receive the luminous flux.

In the image sensor 16 as shown in FIGS. 4 and 5, a pupil image separation system using a pupil imaging lens (microlens) 16A is employed as the pupil division unit.

In the pupil image separation system, the plurality (four in this example) of pixels (first pixel $S_A$, second pixel $S_B$, third pixel $S_C$, and fourth pixel $S_D$) are assigned to one microlens 16A, and a pupil image incident on the one microlens 16A is pupil-divided by the microlens 16A and is received by the four pixels of first pixel $S_A$, second pixel $S_B$, third pixel $S_C$, and fourth pixel $S_D$. Therefore, the pupil image is separated according to an incidence angle of the light to the microlens 16A and is received by the corresponding first pixel $S_A$, second pixel $S_B$, third pixel $S_C$, and fourth pixel $S_D$.

As shown in FIG. 4, the focusing distance of the first region, consisting of the first sub-region $L_A$ and the second sub-region $L_B$, in the vertical direction of the imaging lens 12 corresponds to the distance to the subject 3A, and the focusing distance of the second region consisting of the third sub-region $L_C$ and the fourth sub-region $L_D$ of the imaging lens 12 appearing in the horizontal cross section of the imaging lens 12 corresponds to the distance to the subject 3B.

The luminous flux that passes through one first sub-regions $L_A$ in the vertical direction of the imaging lens 12 and is incident on the microlens 16A is pupil-divided according to the angle of incidence on the microlens 16A and is received by the first pixel $S_A$. The luminous flux that passes through the other second sub-region $L_B$ in the vertical direction of the imaging lens 12 and is incident on the microlens 16A is pupil-divided according to the angle of incidence on the microlens 16A and is received by the second pixel $S_B$.

Similarly, the luminous flux that passes through one third sub-region $L_C$ in the horizontal direction of the imaging lens 12 and is incident on the microlens 16A is pupil-divided according to the angle of incidence on the microlens 16A and is received by the third pixel $S_C$. The luminous flux that passes through the other fourth sub-region $L_D$ in the horizontal direction of the imaging lens 12 and is incident on the microlens 16A is pupil-divided according to the angle of incidence on the microlens 16A and is received by the fourth pixel $S_D$.

As shown in FIG. 5, in the four pixels of first pixel $S_A$, second pixel $S_B$, third pixel $S_C$, and the fourth pixel $S_D$ corresponding to one microlens 16A of the image sensor 16, any one color filter of the three primary colors of R, G, and B (R filter, G filter, and B filter) is disposed according to a predetermined color filter array. The color filter array shown in FIG. 5 is a general Bayer array, but is not limited thereto.

Returning to FIG. 2, the imaging device 10 comprises the imaging lens 12 according to the first embodiment described in FIG. 3 and the image sensor 16 according to the first embodiment described in FIGS. 4 and 5. An overall operation of the device is controlled by a CPU 40.

The operation unit 38 includes a mode dial, a reproduction button, a MENU/OK key, a cross key, a BACK key, and the like in addition to the shutter button 38-1 described above. A signal from the operation unit 38 is input to the CPU 40, and the CPU 40 controls each unit of the imaging device 10 using a memory 48 as a work region in accordance with the input signal and a control program stored in a ROM 49 to perform, for example, imaging operation control, image processing control, recording/reproduction control of image data and the distance map, and display control of the liquid crystal monitor 30.

The CPU 40 functions as a distance calculation unit that measures the distance to the subject using a distance measurement program stored in the ROM 49 and a creation unit of the distance map indicating the distance distribution of the subject in the imaging range, as described below.

The shutter button 38-1 (FIG. 1) is an operation button for inputting an instruction to start imaging and is configured of a two-step stroke type switch having an S1 switch that is turned on in a case where the switch is half-pressed and an S2 switch that is turned on in a case where the switch is fully-pressed.

The mode dial is a selection unit that switches between an automatic imaging mode for imaging a still image, a manual imaging mode, a scene position such as a person, a landscape, and a night view, and a moving image mode for imaging a moving image. A distance map creation mode for creating the distance map can be selected in mode dial. In the distance map creation mode, it is possible to execute the imaging of an image (still image or moving image) at the same time as the distance map is created and record the distance map and the image in association with each other.

The reproduction button is a button for switching to a reproduction mode in which the captured and recorded still image or moving image is displayed on the liquid crystal monitor 30. The MENU/OK key is an operation key having both a function as a menu button for performing an instruction to display a menu on a screen of the liquid crystal monitor 30 and a function as an OK button for performing an instruction to confirm, execute, and the like selection contents. The cross key is an operation unit to input instructions in four directions of up, down, left and right, and functions as a button (cursor movement operation unit) for selecting an item from a menu screen and performing an instruction to select various setting items from each menu. The up/down keys of the cross key function as a zoom switch at the time of imaging or a reproduction zoom switch at the time of the reproduction mode. The left/right keys thereof function as a frame feed (forward/reverse direction) button at the time of the reproduction mode. The BACK key is used for erasing a desired target such as a selection item, erasing instruction contents, or returning to one previous operation state.

In a case where the imaging mode or the distance map creation mode is selected, subject light is incident on a light receiving surface of the image sensor 16 through the imaging lens 12. A signal voltage (or electric charge) stored in the image sensor 16 is stored in a light receiving cell itself or an attached capacitor. The stored signal voltage (or electric charge) is read by the sensor control unit 32 as a pixel value by selection of a pixel position using a method of a MOS type imaging element (so-called CMOS sensor) using an X-Y address system.

Accordingly, it is possible to read image signals, from the image sensor 16, indicating an image $I_A$ (first image) consisting of a first pixel group 22A corresponding to the first pixels $S_A$ arranged two-dimensionally, an image $I_B$ (first image) consisting of a second pixel group 22B corresponding to the second pixels $S_B$, an image $I_C$ (second image) consisting of a third pixel group 22C corresponding to the third pixels $S_C$, and an image $I_D$ (second image) consisting of a fourth pixel group 22D corresponding to the fourth pixels $S_D$.

In a case where a live view image (including moving image) is captured or a still image is captured, the image signal (voltage signal) is read from the image sensor 16 by the sensor control unit 32. In the read image signal, R, G, and B signals for each pixel are sampled and held by correlative double sampling processing (processing of obtaining accurate pixel data by taking a difference between a feedthrough component level and a pixel signal component level included in an output signal of each pixel of the sensor for the purpose of reducing noise (particularly thermal noise) and the like included in the sensor output signal), amplified, and then added to an analog-to-digital (A/D) converter 21. The A/D converter 21 converts the sequentially input R, G, and B signals into R, G, and B digital signals and outputs the digital signals to the image input controller 22. Some MOS type sensors have a built-in A/D converter. In this case, the image sensor 16 directly outputs R, G, and B digital signals.

The image signals indicating the first pixel group 22A (image $I_A$), the second pixel group 22B (image $I_B$), the third pixel 22C (image $I_C$), and the fourth pixel group 22D (image $I_D$) can be selectively read by selecting the pixel position of the image sensor 16 and reading the pixel data. However, all pieces of pixel data may be read from the image sensor 16 and temporarily stored in the memory 48 configured by SDRAM, and the four pieces of image data of the image $I_A$, the image $I_B$, the image $I_C$, and the image $I_D$ may be extracted from the memory 48.

In a case where the image processing is performed, the digital signal processing unit 24 firstly adds a pair of (adjacent) first pixel $S_A$ and second pixel $S_B$ respectively corresponding to the first pixel group 22A (image $I_A$) and the second pixel group 22B (image $I_B$) acquired through the image input controller 22, and creates a second image (symmetric image ($I_A+I_B$)) consisting of the added pixel groups. Similarly, the digital signal processing unit 24 adds a pair of (adjacent) third pixel $S_C$ and fourth pixel $S_D$ respectively corresponding to the third pixel group 22C (image $I_C$) and the fourth pixel group 22D (image $I_D$) acquired through the image input controller 22, and creates a fourth image (symmetric image ($I_C+I_D$)) consisting of the added pixel groups.

Figure 20:
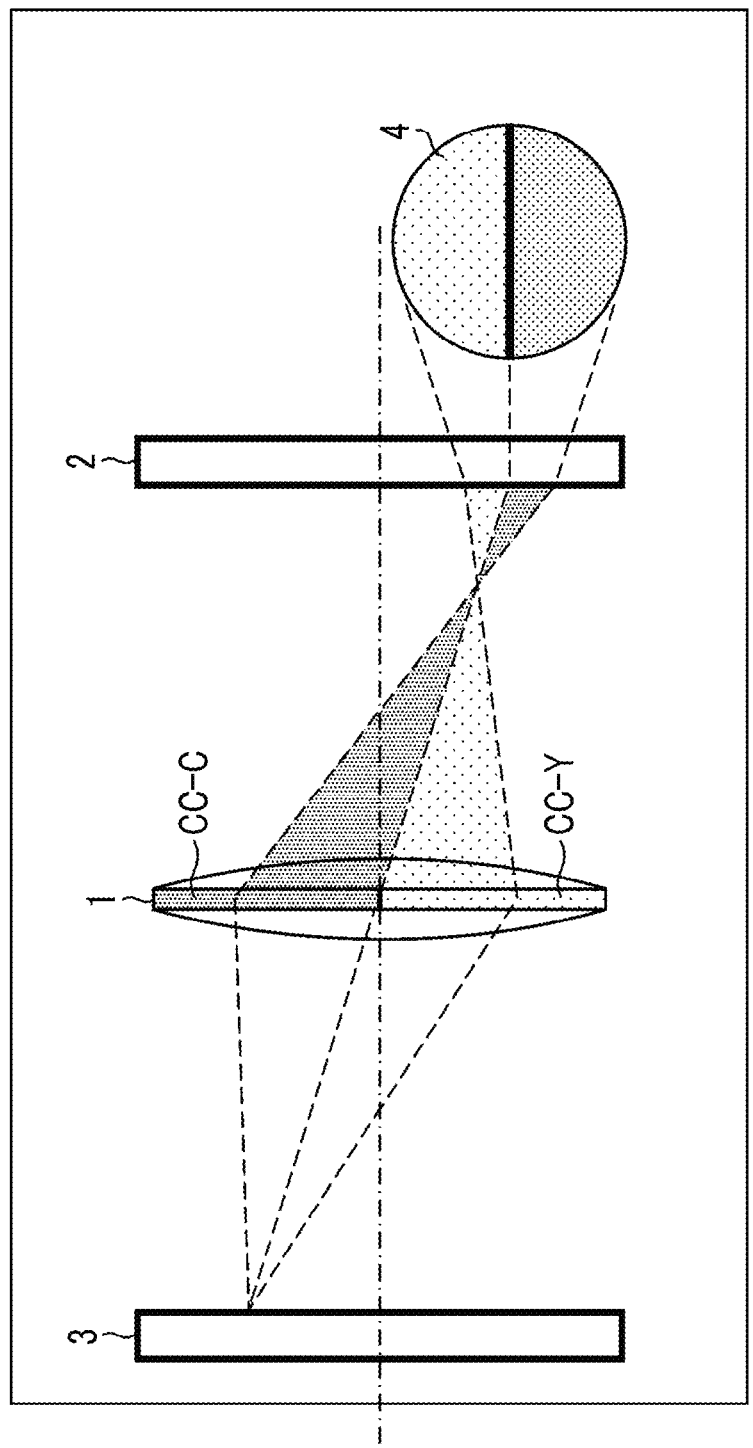
FIG. 20 is an enlarged view of an essential part of an imaging device in the related art that performs color aperture imaging.
Figure 21:
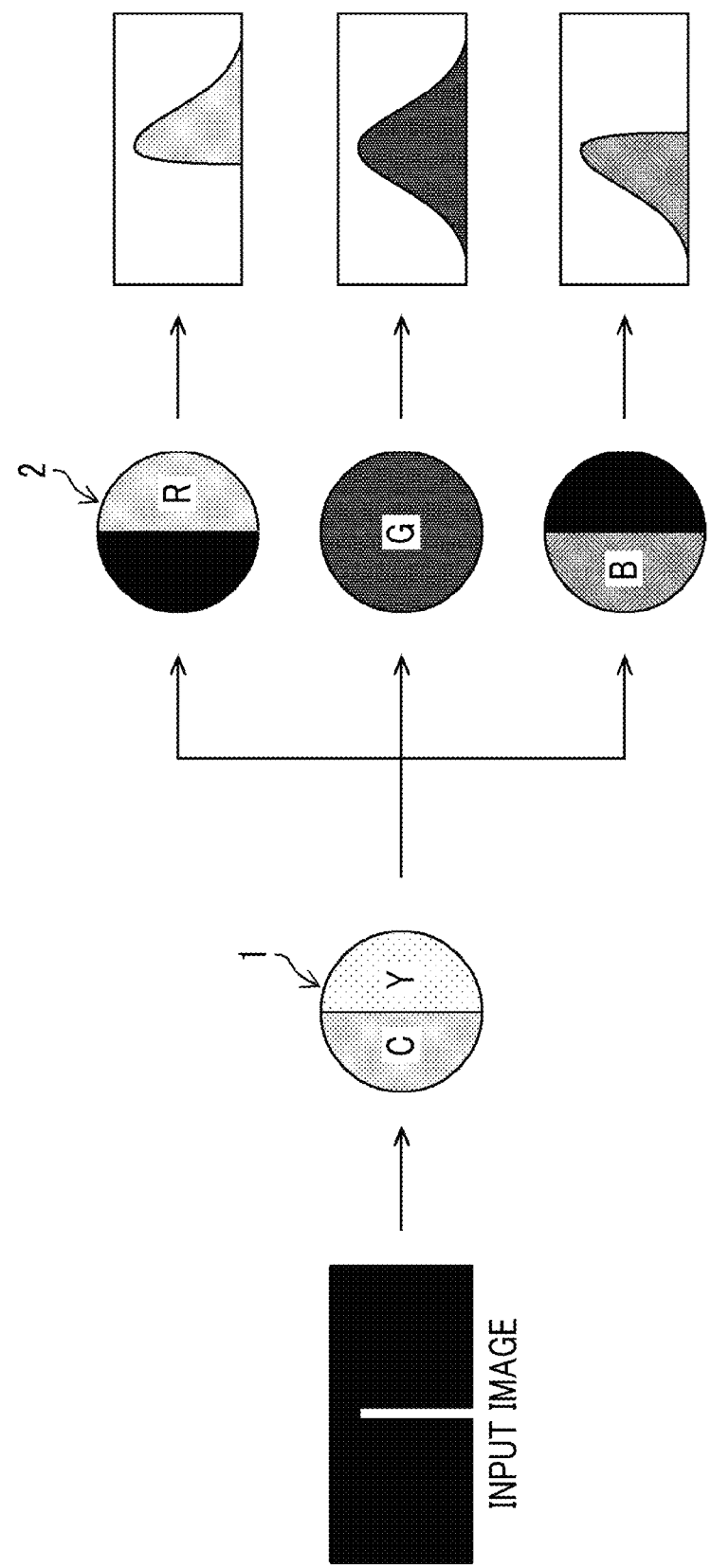
FIG. 21 is a diagram used for describing a principle of distance measurement by the color aperture imaging.

As described with reference to FIG. 20, the light emitted from one point of the subject is incident on the image sensor through the imaging lens. In a case where the distance to the subject is shorter than the focusing distance of the imaging lens (in case of front focus) or far (in case of rear focus), a blurred image of the light emitted from one point increases as the distance from the focusing distance increases.

The luminous flux passing through the first sub-region $L_A$ of the imaging lens 12 is incident on the first pixel $S_A$, and the luminous flux passing through the second sub-region $L_B$ of the imaging lens 12 is incident on the second pixel $S_B$. Therefore, the blurred image appearing in the image $I_A$ of the first pixel group 22A consisting of the first pixels $S_A$ is an asymmetric blur $B_A$, and the blurred image appearing in the image $I_B$ of the second pixel group 22B consisting of the second pixel $S_B$ also is an asymmetric blur $B_B$.

However, the asymmetric blurs $B_A$ and $B_B$ are point-symmetric with respect to each other, and the blurred image appearing in the second image (first symmetric image ($I_A+I_B$)) obtained by adding the images $I_A$ and $I_B$ is symmetrical (symmetric blur $B_{R1}$).

Similarly, the luminous flux passing through the third sub-region $L_C$ of the imaging lens 12 is incident on the third pixel $S_C$, and the luminous flux passing through the fourth sub-region $L_D$ of the imaging lens 12 is incident on the fourth pixel $S_D$. Therefore, the blurred image appearing in the image $I_C$ of the third pixel group 22C consisting of the third pixels $S_C$ is an asymmetric blur $B_C$, and the blurred image appearing in the image $I_D$ of the fourth pixel group 22D consisting of the fourth pixel $S_D$ also is an asymmetric blur $B_D$.

However, the asymmetric blurs $B_C$ and $B_D$ are point-symmetric with respect to each other, and the blurred image appearing in a third image (second symmetric image ($I_C+I_D$)) obtained by adding the images $I_C$ and $I_D$ is symmetrical (symmetric blur $B_{R2}$).

FIG. 7 schematically shows the blurred shapes (point spread function: PSF) of the asymmetric blurs $B_A$, $B_B$, $B_C$, and $B_D$ of the images $I_A$, $I_B$, $I_C$, and $I_D$ and the blurred shapes of the symmetric blurs $B_{R1}$ and $B_{R2}$ of the first symmetric image ($I_A+I_B$) and the second symmetric image ($I_C+I_D$).

As described above, the digital signal processing unit 24 creates the second image (first symmetric image ($I_A+I_B$)) consisting of the added pixel groups by adding a pair of first pixel $S_A$ and second pixel $S_B$ respectively corresponding to the first pixel group 22A (image $I_A$) and the second pixel group 22B (image $I_B$), and creates the fourth image (second symmetric image ($I_C+I_D$)) consisting of the added pixel groups by adding a pair of third pixel $S_C$ and fourth pixel $S_D$ respectively corresponding to the third pixel group 22C (image $I_C$) and the fourth pixel group 22D (image $I_D$) to perform the same processing as normal image signal processing on the first symmetric image ($I_A+I_B$) and the second symmetric image ($I_C+I_D$).

The digital signal processing unit 24 performs predetermined signal processing, on the generated first symmetric image ($I_A+I_B$) and second symmetric image ($I_C+I_D$), such as offset processing, gain control processing including white balance correction and sensitivity correction, gamma-correction processing, and RGB/YC conversion processing for converting the RGB signals into a brightness signal Y and color difference signals Cr and Cb.

The image data processed by the digital signal processing unit 24 is input to a VRAM 50. The image data read from the VRAM 50 is encoded by the video encoder 28 and output to the liquid crystal monitor 30 provided on a rear surface of a camera. Accordingly, a subject image is displayed on the display screen of the liquid crystal monitor 30.

In a case where the shutter button 38-1 of the operation unit 38 is half-pressed (S1 ON), the CPU 40 executes imaging preparation processing such as AF control and AE control. In a case where the shutter button 38-1 thereof is fully-pressed (S2 ON), the CPU 40 executes imaging processing and recording processing of the image.

An AE detection unit 44 integrates the G signals of the RGB color signals output from the image sensor 16 over the entire screen or integrates the G signals weighted differently in a central portion and a peripheral portion of the screen, and outputs an integrated value to the CPU 40. The CPU 40 calculates brightness (imaging Ev value) of the subject from the integrated value input from the AE detection unit 44, decides a stop value of a stop (not shown) and an electronic shutter (shutter speed) of the image sensor 16 according to a predetermined program diagram based on the imaging Ev value, and controls the stop based on the decided stop value and a charge accumulation time in the image sensor 16 through the sensor control unit 32 based on the decided shutter speed.

An AF detection unit 46 calculates a defocus amount necessary for controlling a phase difference AF and controls a position of the imaging lens 12 in an optical axis direction based on the calculated defocus amount to perform focusing control of focusing on a main subject.

For the defocus amount necessary for controlling the phase difference AF, a first pixel value and a second pixel value are respectively acquired from the first pixel $S_A$ and the second pixel $S_B$ in an AF region of the image sensor 16, and the phase difference is detected based on the first pixel value and the second pixel value. The phase difference can be calculated from a shift amount between the first pixel value and the second pixel value in a pupil division direction, in a case where a correlation between a plurality of first pixel values of the first pixel $S_A$ and a plurality of second pixel values of the second pixel $S_B$ is maximized (in a case where an integrated value of difference absolute values of the plurality of first pixel values and the plurality of second pixel values is minimized). The defocus amount can be calculated by multiplying the detected phase difference by a coefficient corresponding to a current F number (light ray angle) of the imaging lens 12.

The image data output from the A/D converter 21 in response to the press of the shutter button 38-1 is input from the image input controller 22 to the memory 48 and temporarily stored. The image data temporarily stored in the memory 48 is read by the digital signal processing unit 24 and subjected to the predetermined signal processing as described above. The brightness signal Y and the color difference signals Cr and Cb generated from the RGB signals are stored in the memory 48 again.

The brightness signal Y and the color difference signals Cr and Cb stored in the memory 48 are respectively output to the compression/expansion processing unit 26, subjected to predetermined compression processing such as joint photographic experts group (JPEG), and then recorded in the memory card 54 through the media controller 52.

<Measurement of Subject Distance>

Figure 6:
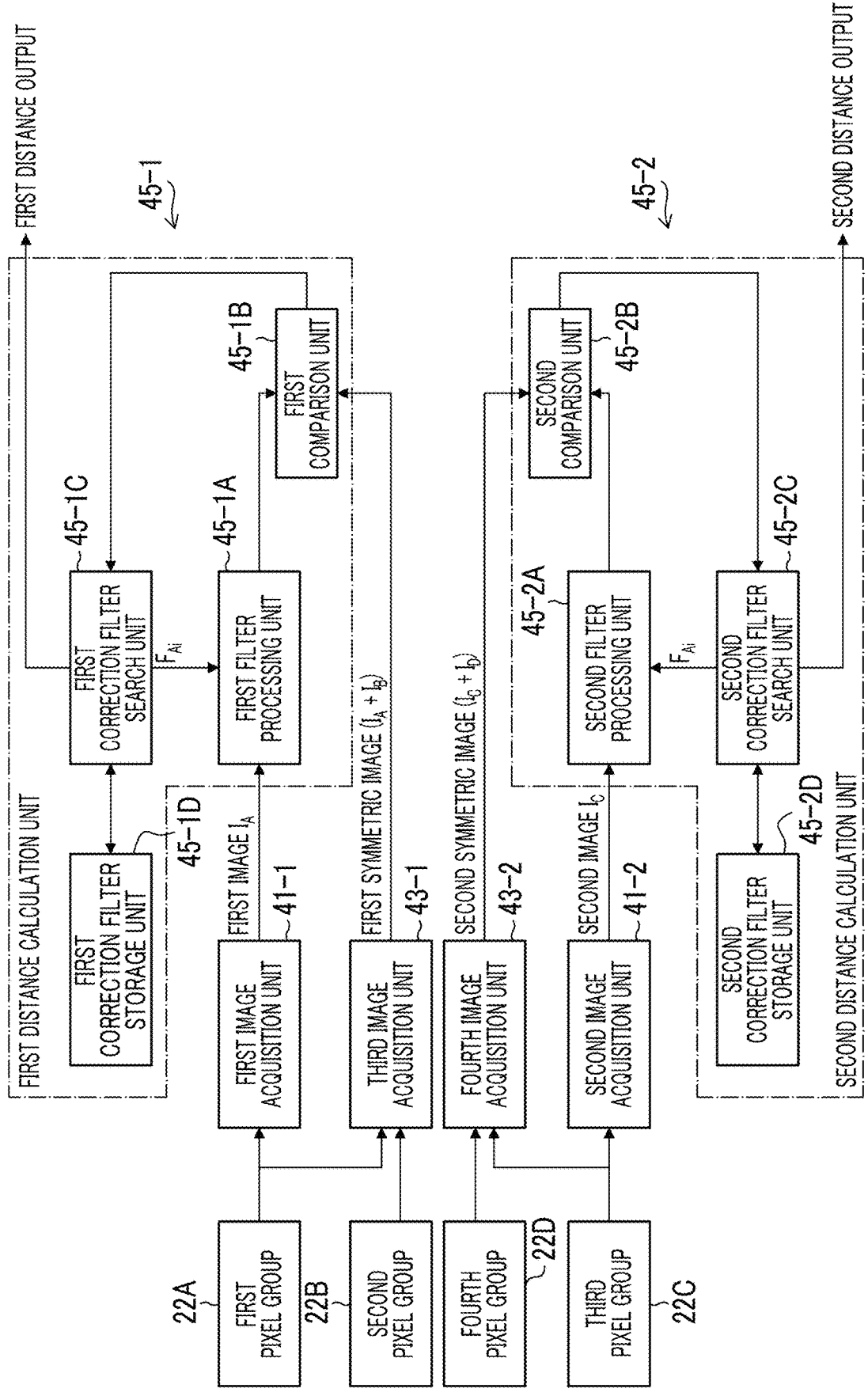
FIG. 6 is a functional block diagram of a CPU 40 and a ROM 49 that mainly function as a measurement unit that measures a distance to a subject within an imaging range.

FIG. 6 is a functional block diagram of the CPU 40 and the ROM 49 that mainly function as the measurement unit that measures the distance to the subject within the imaging range.

In a case where the distance map creation mode is selected by the mode dial, the CPU 40 executes the distance measurement program stored in the ROM 49 by using the memory 48 as a work region to function as a first image acquisition unit 41-1, a second image acquisition unit 41-2, a third image acquisition unit 43-1, a fourth image acquisition unit 43-2, a first distance calculation unit 45-1, and a second distance calculation unit 45-2. The ROM 49 is a correction filter used for measuring the distance to the subject and functions as a first correction filter storage unit 45-1D that stores a plurality of correction filters $F_A$ having different filter sizes and filter coefficients according to at least the distance to the subject and a second correction filter storage unit 45-2D that stores a plurality of correction filters $F_C$.

The distance map creation mode is selected, and the first pixel group 22A, the second pixel group 22B, the third pixel group 22C, and the fourth pixel group 22D imaged by the imaging lens 12 and the image sensor 16 are temporarily stored in the memory 48.

The first image acquisition unit 41-1 reads the first pixel group 22A from the memory 48 to acquire the first image (image $I_A$) consisting of the first pixel group 22A.

The second image acquisition unit 41-2 reads the third pixel group 22C from the memory 48 to acquire the second image (image $I_C$) composed of the third pixel group 22C.

The third image acquisition unit 43-1 reads the first pixel group 22A and the second pixel group 22B from the memory 48, and adds the pixel values of the pair of first pixel $S_A$ and second pixel $S_B$ respectively corresponding to the first pixel group 22A and the second pixel group 22B to acquire the third image (first symmetric image ($I_A+I_B$)) consisting of the added pixel groups.

The fourth image acquisition unit 43-2 reads the third pixel group 22C and the fourth pixel group 22D from the memory 48, and adds the pixel values of the pair of third pixel $S_C$ and fourth pixel $S_D$ respectively corresponding to the third pixel group 22C and the fourth pixel group 22D to acquire the fourth image (second symmetric image ($I_C+I_D$)) consisting of the added pixel groups.

As shown in FIG. 7, the images $I_A$ and $I_C$ are images having the asymmetric blurs $B_A$ and $B_C$, and the first symmetric image ($I_A+I_B$) and the second symmetric image ($I_C+I_D$) are images having the symmetric blurs $B_{R1}$ and $B_{R2}$.

The first distance calculation unit 45-1 is mainly configured of a first filter processing unit 45-1A, a first comparison unit 45-1B, a first correction filter search unit 45-1C, and the first correction filter storage unit 45-1D.

The first filter processing unit 45-1A is a part that corrects (repairs) the asymmetric blur $B_A$ of a first local image in a local region with a position (pixel position) of the subject of the image $I_A$, which is the first image, as a center to the symmetric blur (symmetric blur $B_{R1}$ at the same pixel position of the first symmetric image $(I_A+I_B)$) by using a first correction filter $F_{Ai}$.

The first filter processing unit 45-1A acquires one first correction filters $F_{Ai}$ of a plurality of first correction filters $(F_{A1}, F_{A2}, \ldots, F_{A(i-1)}, F_{Ai}, F_{A(i+1)}, \ldots)$ stored in the first correction filter storage unit 45-1D from the first correction filter search unit 45-1C and performs a convolution operation between the first local image having the asymmetric blur $B_A$ and the acquired first correction filter $F_{Ai}$ to generate a first local image corrected by the first correction filter $F_{Ai}$.

The first comparison unit 45-1B compares the first local image corrected by the first correction filter $F_{Ai}$ with a third local image (third local image having symmetric blur $B_{R2}$) in the same local region as the first local image in the first symmetric image $(I_A+I_B)$ generated by the third image acquisition unit 43-1, and outputs an evaluation value E (in this example, evaluation value is set to zero in case of perfect match and increases as correlation is smaller) indicating a correlation between the corrected first local image and the third local image to the first correction filter search unit 45-1C.

The first correction filter search unit 45-1C is a part that searches for the first correction filter in a case where the correlation between the first local image in which the asymmetric blur is corrected and the third local image is maximized, from the plurality of first correction filters stored in the first correction filter storage unit 45-1D.

That is, the first correction filter search unit 45-1C searches for the first correction filter in a case where the correlation between the first local image in which the asymmetric blur is corrected and the third local image is maximized, from the plurality of correction filters stored in the first correction filter storage unit 45-1D, based on the evaluation value E indicating the comparison result of the first comparison unit 45-1B.

The first correction filter storage unit 45-1D stores the plurality of first correction filters $(F_{A1}, F_{A2}, F_{A(i-1)}, F_{Ai}, F_{A(i+1)}, \ldots)$ having different filter sizes and filter coefficients according to the distance to the subject.

In this example, at the time of imaging in the distance map creation mode, the stop (not shown) is a fixed stop set in advance and, as shown in FIG. 4, the lens of the first region (first sub-region $L_A$ and second sub-region $L_B$) of the imaging lens 12 is set to a lens position where the subject at the subject distance D1 set in advance is focused. In this case, the lens of the second region (third sub-region $L_C$ and fourth sub-region $L_D$) of the imaging lens 12 is set to a lens position where the subject at the subject distance D2 closer than the subject distance D1 is focused.

A point light source located at the subject distance set in advance is minimized on the light receiving surface of the image sensor 16. With an ideal imaging lens 12, the point light source is imaged as a point, but has a point spread based on a point spread function (PSF) of the first region and the second region of the imaging lens 12. The blurred image gradually spreads as the point light source moves away from the subject distance set in advance, and there is a correlation between the subject distance and the blurred shape of the blurred image.

The first local image of the local region with the position (pixel position) of the subject of the image $I_A$ as a center has the asymmetric blur $B_A$ according to the distance to the subject. In a case where it is possible to search for the first correction filter $F_{Ai}$ that repairs the asymmetry of the asymmetric blur $B_A$ and matches the symmetric blur $B_{R1}$ of the third local image in the same local region as the first local image of the first symmetric image $(I_A+I_B)$, the distance to the subject associated with the searched first correction filter $F_{Ai}$ can be set as the distance to the subject corresponding to the first local image.

The first correction filter storage unit 45-1D stores the plurality of first correction filters $(F_{A1}, F_{A2}, \ldots, F_{A(i-1)}, F_{Ai}, F_{A(i+1)}, \ldots)$ that repair the asymmetric blur $B_A$ of the image $I_A$ to the symmetric blur $B_{R1}$ of the first symmetric image $(I_A+I_B)$ according to the distance to the subject.

The first correction filter search unit 45-1C searches for the first correction filter $F_{Ai}$ in a case where the correlation between the first local image in which the asymmetric blur $B_A$ is corrected by a certain first correction filter $F_{Ai}$ and the second local image having the symmetric blur $B_{R1}$ is maximized, from among the large number of first correction filters stored in the first correction filter storage unit 45-1D, based on the evaluation value indicating the comparison result of the first comparison unit 45-1B to acquire the distance to the subject associated with the searched first correction filter $F_{Ai}$ as the distance to the subject corresponding to the first local image having the asymmetric blur $B_A$.

The first distance calculation unit 45-1 outputs the distance to the subject acquired in this manner, together with position information in the image $I_A$ to create the distance map.

The distance to the subject is measured at all pixel positions in the image $I_A$, and thus it is possible to create the distance map indicating the distance distribution of the subject in the imaging range. A color or a density is changed according to the distance, and thus it is also possible to create a distance image in which the distance distribution of the subject can be visually recognized.

The second distance calculation unit 45-2 is mainly configured of a second filter processing unit 45-2A, a second comparison unit 45-2B, a second correction filter search unit 45-2C, and a second correction filter storage unit 45-2D, and performs the same distance measurement as the first distance calculation unit 45-1.

The second filter processing unit 45-2A is a part that corrects (repairs) the asymmetric blur $B_C$ of the second local image in a local region with a position (pixel position) of the subject of the image $I_C$, which is the second image, as a center to the symmetric blur (symmetric blur $B_{R2}$ at the same pixel position of the second symmetric image $(I_C+I_D)$) by using the second correction filter $F_{Ci}$.

The second filter processing unit 45-2A acquires one second correction filters $F_{Ci}$ of a plurality of second correction filters $(F_{C1}, F_{C2}, \ldots, F_{C(i-1)}, F_{Ci}, F_{C(i+1)}, \ldots)$ stored in the second correction filter storage unit 45-2D from the second correction filter search unit 45-2C and performs the convolution operation between the second local image having the asymmetric blur $B_C$ and the acquired second correction filter $F_{Ci}$ to generate a second local image corrected by the second correction filter $F_{Ci}$.

The second comparison unit 45-2B compares the second local image corrected by the second correction filter $F_{Ci}$ with a fourth local image (second local image having symmetric blur $B_{R2}$) in the same local region as the first local image in the second symmetric image ($I_C+I_D$) generated by the fourth image acquisition unit 43-2, and outputs an evaluation value E indicating a correlation between the corrected second local image and the fourth local image to the second correction filter search unit 45-2C.

The second correction filter search unit 45-2C is a part that searches for the second correction filter in a case where the correlation between the second local image in which the asymmetric blur is corrected and the fourth local image is maximized, from the plurality of second correction filters stored in the second correction filter storage unit 45-2D.

That is, the second correction filter search unit 45-2C searches for the second correction filter in a case where the correlation between the second local image in which the asymmetric blur is corrected and the fourth local image is maximized, from the plurality of correction filters stored in the second correction filter storage unit 45-2D, based on the evaluation value E indicating the comparison result of the second comparison unit 45-2B.

The second correction filter storage unit 45-2D stores the plurality of second correction filters ($F_{C1}, F_{C2}, \ldots, F_{C(i-1)}, F_{Ci}, F_{C(i+1)}, \ldots$) having different filter sizes and filter coefficients according to the distance to the subject.

That is, the second correction filter storage unit 45-2D stores the plurality of second correction filters ($F_{C1}, F_{C2}, \ldots, F_{C(i-1)}, F_{Ci}, F_{C(i+1)}, \ldots$) that repair the asymmetric blur $B_C$ of the image $I_C$ to the symmetric blur $B_{R2}$ of the second symmetric image ($I_C+I_D$) according to the distance to the subject.

The second correction filter search unit 45-2C searches for the second correction filter $F_{Ci}$ in a case where the correlation between the second local image in which the asymmetric blur $B_C$ is corrected by a certain second correction filter $F_{Ci}$ and the fourth local image having the symmetric blur $B_{R2}$ is maximized, from among the large number of second correction filters stored in the second correction filter storage unit 45-2D, based on the evaluation value indicating the comparison result of the second comparison unit 45-2B to acquire the distance to the subject associated with the searched second correction filter $F_{Ci}$ as the distance to the subject corresponding to the second local image having the asymmetric blur $B_C$.

The second distance calculation unit 45-2 outputs the distance to the subject acquired in this manner, together with position information in the image $I_C$ to create the distance map.

The distance to the subject is measured at all pixel positions in the image $I_C$, and thus it is possible to create the distance map indicating the distance distribution of the subject in the imaging range.

FIG. 7 are diagrams schematically showing the images $I_A$, $I_B$, $I_C$, and $I_D$, the first symmetric image ($I_A+I_B$), blurred shape (PSF shape) of the second symmetric image ($I_C+I_D$), and the shapes of correction filters $F_{Ai}$, $F_{Bi}$, $F_{Ci}$, and $F_{Di}$ applied to the images $I_A$, $I_B$, $I_C$, and $I_D$.

As shown in FIG. 7, the image $I_A$ has the asymmetric blur $B_A$, the image $I_B$ has the asymmetric blur $B_A$ and the point-symmetrical asymmetric blur $B_B$, and the first symmetric image ($I_A+I_B$) has the symmetric blur $B_{R1}$. The shape of the correction filter $F_{Ai}$ that repairs the asymmetric blur $B_A$ and a shape of a correction filter $F_{Bi}$ that repairs the asymmetric blur $B_B$ are point-symmetric.

In a case where the PSF shape of the asymmetric blur $B_A$ repaired by the correction filter $F_{Ai}$ matches the blurred shape (PSF shape) of the symmetric blur $B_{R1}$ of the first symmetric image ($I_A+I_B$), it is possible to obtain the distance to the subject associated with the correction filter $F_{Ai}$ as the distance to the subject corresponding to the first local image having the asymmetric blur $B_A$.

Similarly, the image $I_C$ has the asymmetric blur $B_C$, the image $I_D$ has the asymmetric blur $B_C$ and the point-symmetrical asymmetric blur $B_D$, and the second symmetric image ($I_C+I_D$) has the symmetric blur $B_{R2}$. The shape of the correction filter $F_{Ci}$ that repairs the asymmetric blur $B_C$ and the shape of the correction filter $F_{Di}$ that repairs the asymmetric blur $B_D$ are point-symmetric.

In a case where the PSF shape of the asymmetric blur $B_C$ repaired by the correction filter $F_{Ci}$ matches the blurred shape (PSF shape) of the symmetric blur $B_{R2}$ of the second symmetric image ($I_C+I_D$), it is possible to obtain the distance to the subject associated with the correction filter $F_{Ci}$ as the distance to the subject corresponding to the first local image having the asymmetric blur $B_C$.

Next, a reason why the first distance calculation unit 45-1 performs the distance measurement based on the first symmetric image ($I_A+I_B$), and the second distance calculation unit 45-2 performs the distance measurement based on the second symmetric image ($I_C+I_D$) will be described.

Figure 8:
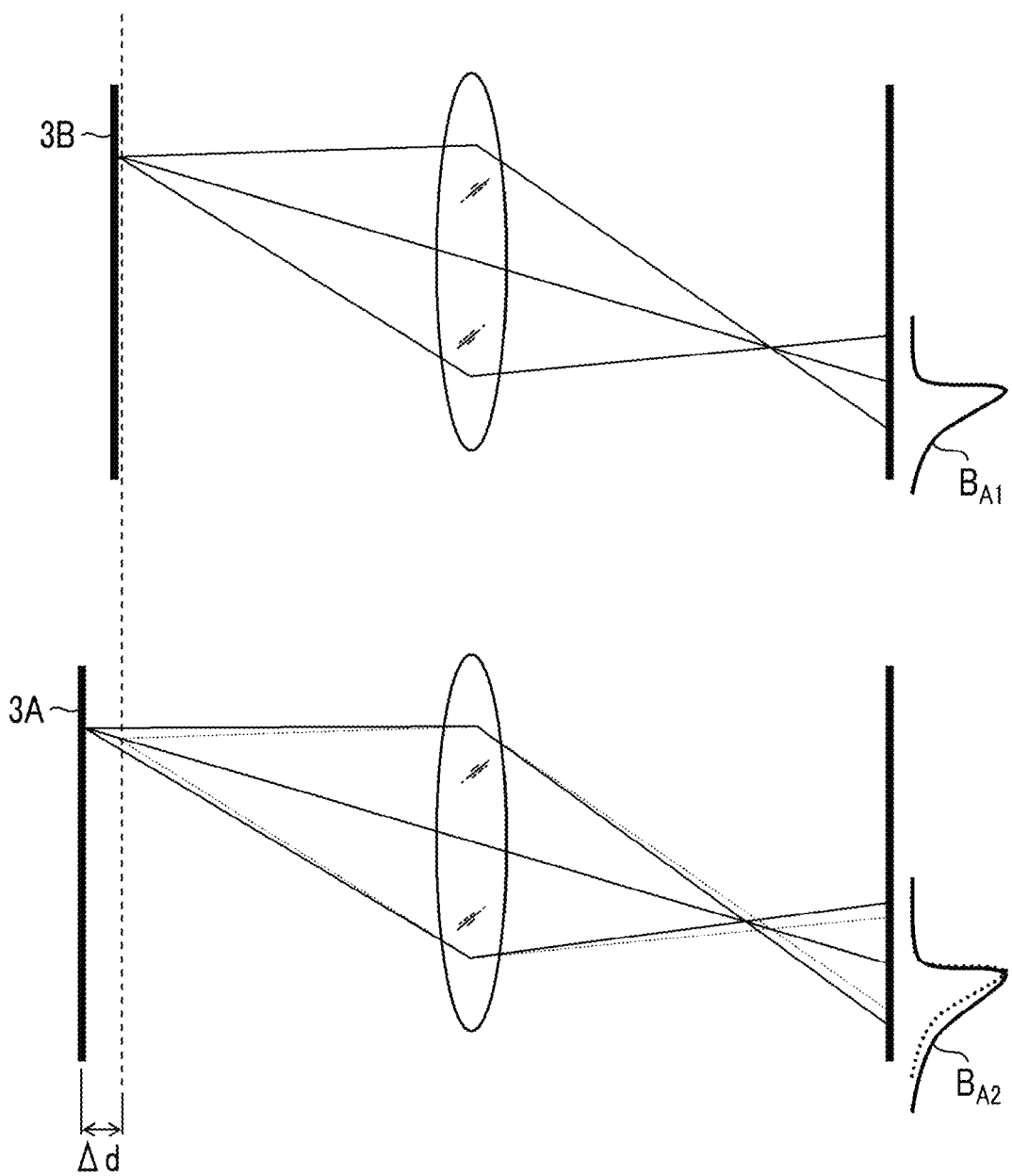
FIG. 8 is a diagram showing a relationship between a distance difference Δd between subjects 3A and 3B and asymmetric blurs $B_{A1}$ and $B_{A2}$.

As shown in FIG. 8, a distance difference between the subject 3B and the subject 3A is $\Delta d$, the asymmetric blur of the subject 3B is $B_{A1}$, and the asymmetric blur of the subject 3A is $B_{A2}$. A change rate of the blur size between the asymmetric blur $B_{A1}$ and the asymmetric blur $B_{A2}$ is $\Delta brs$.

Figure 9:
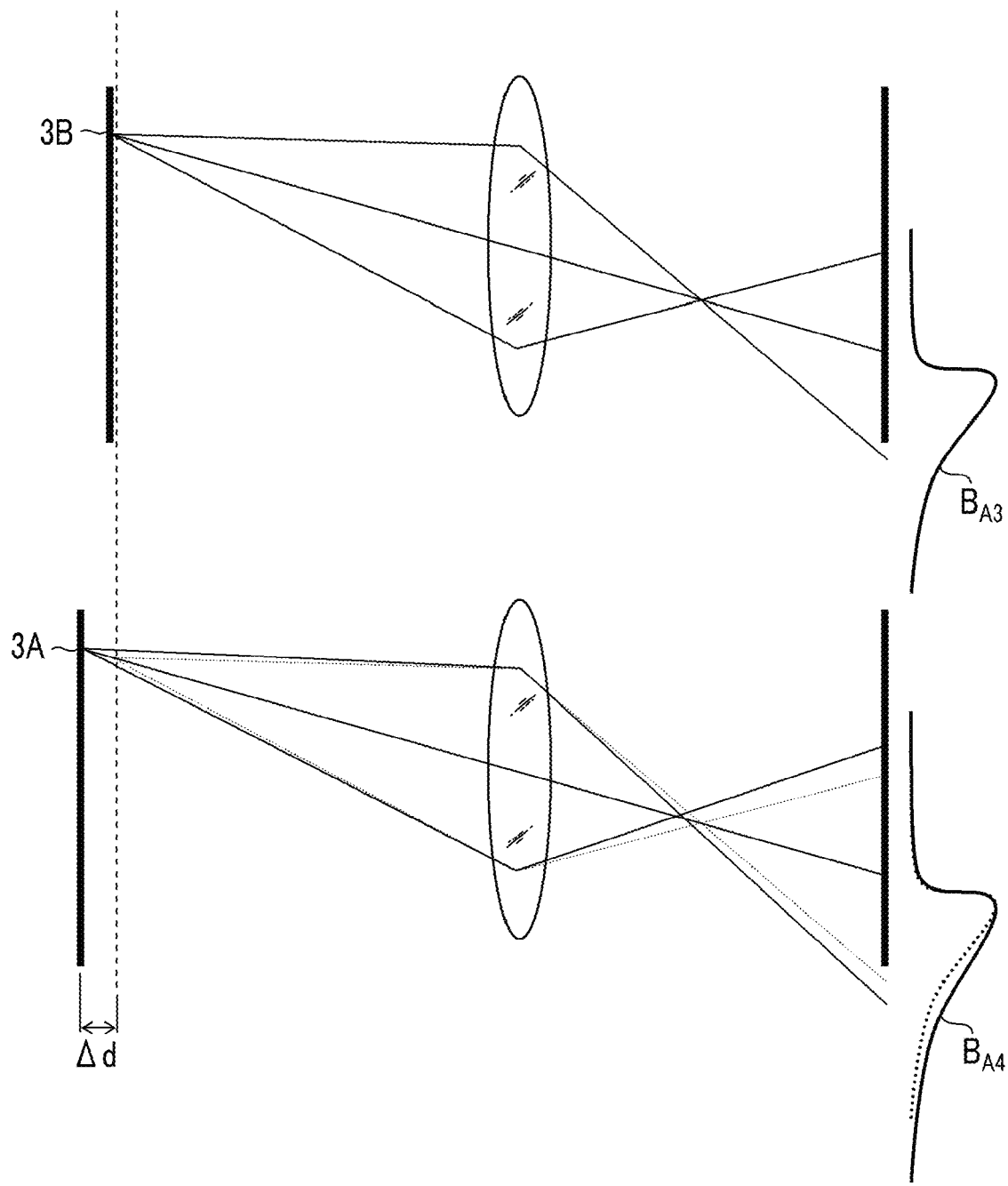
FIG. 9 is a diagram showing a relationship between the distance difference Δd between the subjects 3A and 3B and asymmetric blurs $B_{A3}$ and $B_{A4}$.

On the other hand, as shown in FIG. 9, the distance difference between the subject 3B and the subject 3A is $\Delta d$, the asymmetric blur of the subject 3B is $B_{A3}$, and the asymmetric blur of the subject 3A is $B_{A4}$. A change rate of the blur size between the asymmetric blur $B_{A3}$ and the asymmetric blur $B_{A4}$ is $\Delta brL$.

As shown in FIGS. 8 and 9, the size and deformation of the blur are proportional to a distance from a focusing position. Therefore, a degree of change (change rate) of blurring with respect to a certain distance difference $\Delta d$ is large near the focusing position and small in a place away from the focusing position. This means that detection power of the distance difference $\Delta d$ is large near the focusing position and small at the place away from the focusing position in a case where the ability to detect a degree of shape conformity of blur is the same. In other words, the blur is larger in a case where the focusing position is moved away. Therefore, the change rate of the blur size is small and the distance detection power (distance resolution) decreases.

In the example shown in FIGS. 8 and 9, even in a case where the distance difference $\Delta d$ is the same, the change rate of the blur size $\Delta brs$ shown in FIG. 8 is larger than the change rate of the blur size $\Delta brL$ shown in FIG. 9 ($\Delta brs > \Delta brL$). The distance detection power for the same distance difference $\Delta d$ in the case of FIG. 8 in which the distances of the subjects 3A and 3B are close to the focusing position is higher than in the case of FIG. 9 in which the distances of the subjects 3A and 3B are away from the focusing position.

In the present embodiment, the distance measurement based on the first image (image $I_A$) and the first symmetric image, which can be simultaneously captured by the imaging lens 12 and the image sensor 16, and the distance measurement based on the second image (image $I_C$) and the second symmetric image ($I_C+I_D$) are performed by using a bifocal imaging lens 12 with the first region (first sub-region $L_A$ and second sub-region $L_B$) having a focusing distance for focusing on a distant subject (subject at the subject distance D1) and the second region (third sub-region $L_C$ and fourth sub-region $L_D$) having a focusing distance for focusing on a close subject (subject at the subject distance D2), and a selection unit selects a distance having higher distance detection power (distance resolution) according to the subject distance. Therefore, it is possible to perform the distance measurement with higher accuracy.

Specifically, searchable first correction filter $F_A$ and second correction filter $F_C$ can be selected by dividing the correction filters according to the distance to the subject such that the subject distance calculated by the first distance calculation unit 45-1 shown in FIG. 6 and the subject distance calculated by the second distance calculation unit 45-2 do not overlap with each other.

In the embodiment shown in FIG. 6, the distance to the subject is measured by searching for the first correction filter $F_{Ai}$ that repairs the asymmetric blur $B_A$ of the image $I_A$ to the symmetric blur $B_{R1}$ from the plurality of correction filters $F_A$. However, the distance to the subject may be measured by searching for the correction filter $F_{Bi}$ that repairs the asymmetric blur $B_B$ of the image $I_B$ as the first image to the symmetric blur $B_R$ from the plurality of correction filters FB. The distance to the subject is measured by searching for the second correction filter $F_{Ci}$ that repairs the asymmetric blur $B_C$ of the image $I_C$ to the symmetric blur $B_{R2}$ from the plurality of correction filters $F_C$. However, the distance to the subject may be measured by searching for the second correction filter $F_{Di}$ that repairs the asymmetric blur $B_D$ of the image $I_D$ as the second image to the symmetric blur $B_{R2}$ from the plurality of second correction filters FD.

Figure 10:
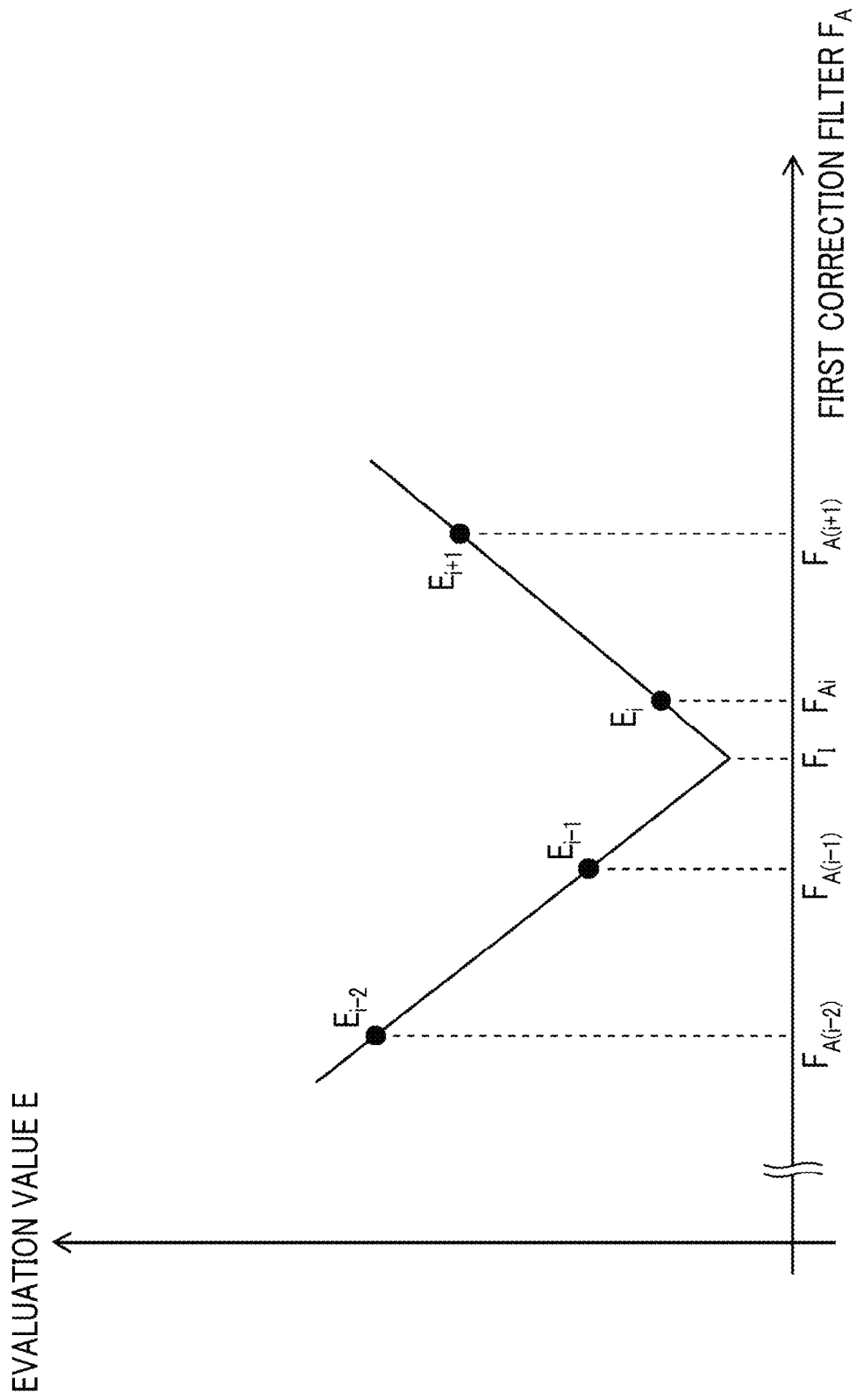
FIG. 10 is a graph showing a first correction filter $F_A$ associated with a distance to a subject on the horizontal axis and an evaluation value E indicating a correlation between a certain first local image of the image $I_A$ corrected by each first correction filter $F_A$ and a second local image of the first symmetric image ($I_A+I_B$) on the vertical axis.

FIG. 10 is a graph showing the first correction filter $F_A$ associated with the distance to the subject in the horizontal axis and the evaluation value E indicating the correlation between a certain first local image of the image $I_A$ corrected by each first correction filter $F_A$ and the second local image of the first symmetric image $(I_A+I_B)$ in the vertical axis. As described above, the evaluation value E is smaller as the correlation is higher.

In FIG. 10, the first correction filter $F_A$ having a minimum evaluation value E (maximum correlation) is the first correction filter $F_{Ai}$, but the distance to the subject associated with the plurality of first correction filters $F_A$ is a discrete distance for each first correction filter. Therefore, in a case where the distance to the subject associated with the first correction filter $F_{Ai}$ is used as a distance measurement value as it is, the accuracy is low.

Therefore, it is preferable to estimate a first correction filter $F_I$ having the minimum evaluation value E based on the distance to the subject corresponding to the plurality of first correction filters $(F_{A(i-2)}, F_{A(i-1)}, F_{Ai}, F_{A(i+1)}, \ldots)$ before and after including the first correction filter $F_{Ai}$ having the minimum evaluation value E, and a plurality of evaluation values $(E_{(i-2)}, E_{(i-1)}, E_i, E_{(i+1)})$ and to use a distance corresponding to the estimated first correction filter $F_I$ as the measurement value.

In FIG. 10, the correction filter $F_I$ having the minimum evaluation value E is estimated from a point where a straight line passing through the two evaluation values $(E_{(i-2)}, E_{(i-1)})$ intersects with a straight line passing through the two evaluation values $(E_i, E_{(i+1)})$. The estimation of the first correction filter $F_I$ having the minimum evaluation value E is not limited to the example shown in FIG. 10. It is possible to obtain an approximate curve passing through the evaluation values from the plurality of evaluation values of three or more points before and after including an evaluation value E and to estimate the first correction filter $F_I$ having the minimum evaluation value E from the minimum value of the approximate curve.

In a case where the distance to the subject is calculated based on the image $I_C$, which is the second image, and the second symmetric image $(I_C+I_D)$, it is preferable to perform the same calculation as above.

<Second Embodiment of Image Sensor>

Figure 11:
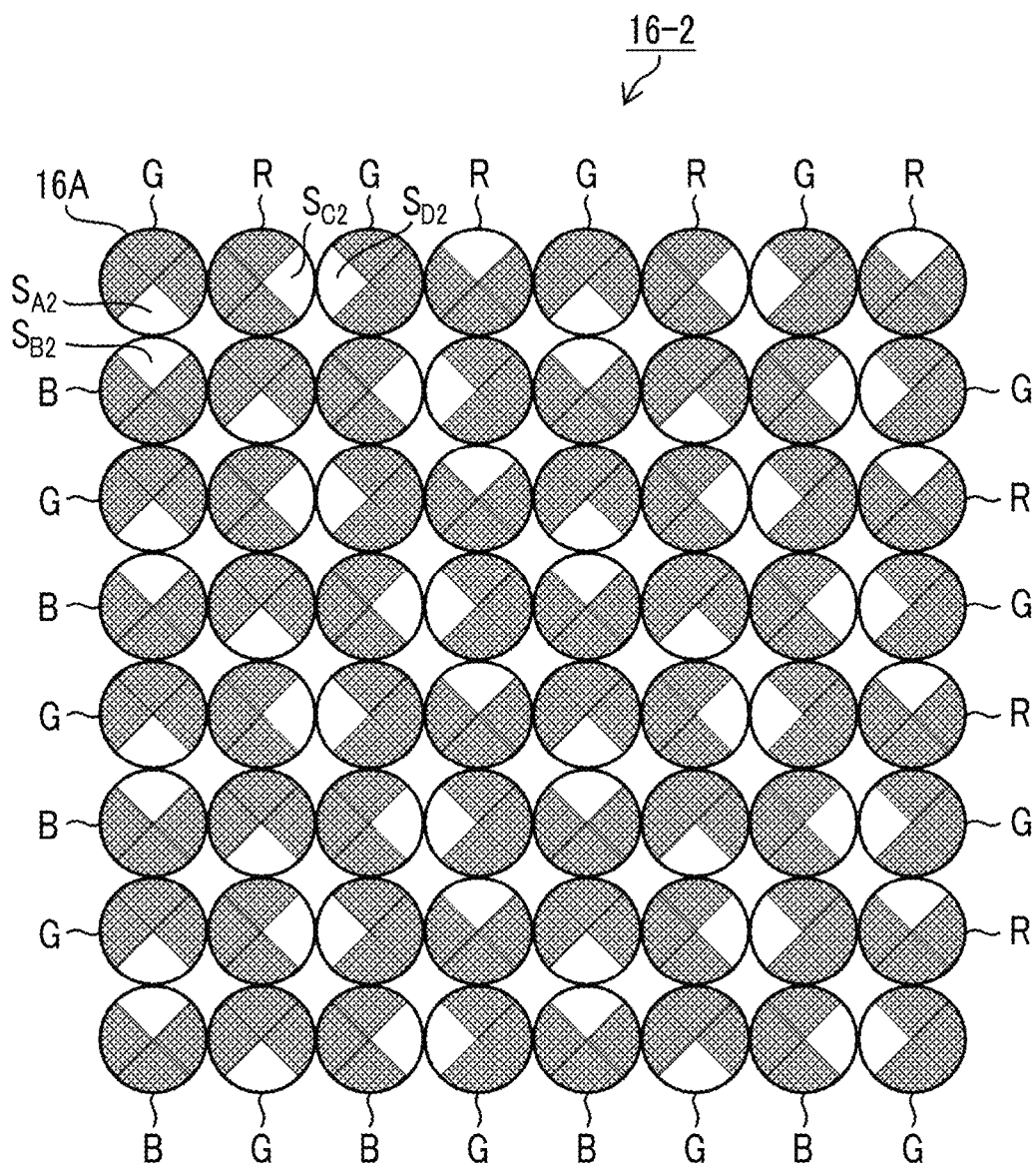
FIG. 11 is a front view of an image sensor 16-2 according to a second embodiment.

FIG. 11 is a front view of an image sensor 16-2 according to a second embodiment.

The image sensor 16-2 according to the second embodiment employs a light-shielding mask system using a light-shielding mask as the pupil division unit.

FIG. 11 shows a first pixel $S_{A2}$, a second pixel $S_{B2}$, a third pixel $S_{C2}$, and a fourth pixel $S_{D2}$ corresponding to the first pixel $S_A$, the second pixel $S_B$, the third pixel $S_C$, and the fourth pixel $S_D$ by the pupil image separation system shown in FIG. 4. The first pixel $S_{A2}$, the second pixel $S_{B2}$, the third pixel $S_{C2}$, and the fourth pixel $S_{D2}$ are provided with four kinds of light-shielding masks for pupil division forming a first aperture, a second aperture, a third aperture, and a fourth aperture having different aperture positions, respectively. The luminous flux incident through the first sub-region $L_A$, the second sub-region $L_B$, the third sub-region $L_C$, and the fourth sub-region $L_D$ of the imaging lens 12 is pupil-divided by the light-shielding masks and is incident on the first pixel $S_{A2}$, the second pixel $S_{B2}$, the third pixel $S_{C2}$, and the fourth pixel $S_{D2}$.

Figure 12:
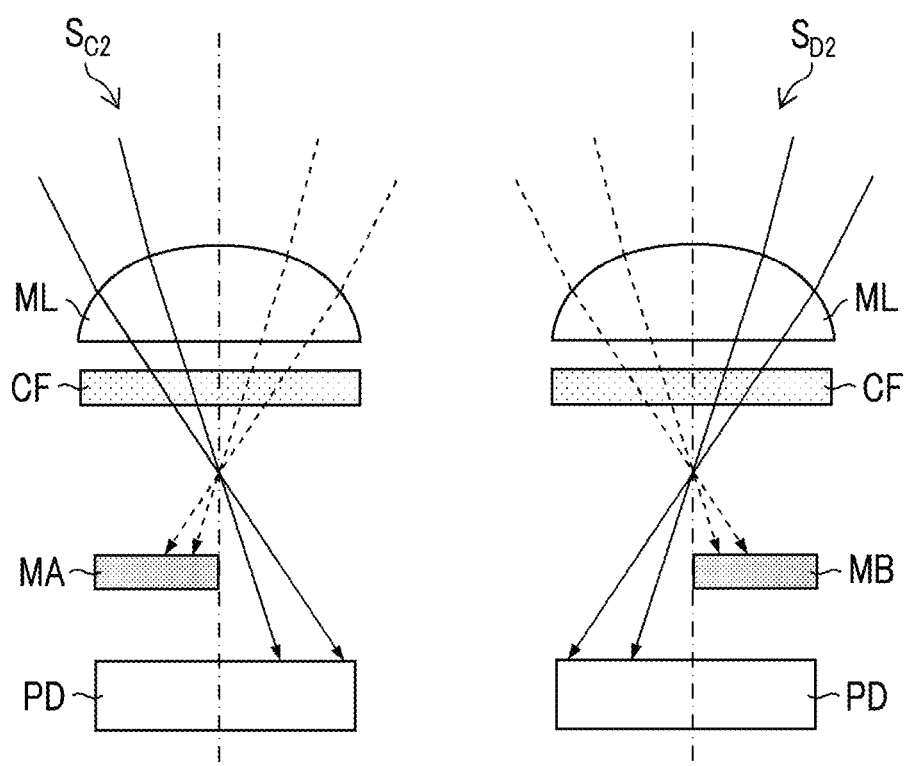
FIG. 12 is an enlarged view of an essential part showing configurations of a third pixel $S_{C2}$ and a fourth pixel $S_{D2}$ corresponding to a third pixel $S_C$ and a fourth pixel $S_D$ by a pupil image separation system shown in FIG. 4.

FIG. 12 is an enlarged view of an essential part showing configurations of the third pixel $S_{C2}$ and the fourth pixel $S_{D2}$ corresponding to the third pixel $S_C$ and the fourth pixel $S_D$ by the pupil image separation system shown in FIG. 4.

As shown in FIG. 12, a light-shielding mask MA for pupil division having an aperture (third aperture) is disposed on a front surface side (microlens ML side) of a photodiode PD of the third pixel $S_{C2}$, while a light-shielding mask MB for pupil division having an aperture (fourth aperture) whose aperture position is different from the third aperture is disposed on a front surface side of a photodiode PD of the fourth pixels $S_{D2}$. The microlenses ML and the light-shielding masks MA and MB have a pupil division function.

Therefore, as shown in FIG. 12, the third pixel $S_{C2}$ selectively receives only the luminous flux passing through the third sub-region $L_C$ of the four divided regions of the imaging lens 12, and the fourth pixel $S_{D2}$ selectively receives only the luminous flux passing through the fourth sub-region $L_D$ of the imaging lens 12.

<Third Embodiment of Image Sensor>

Figure 13:
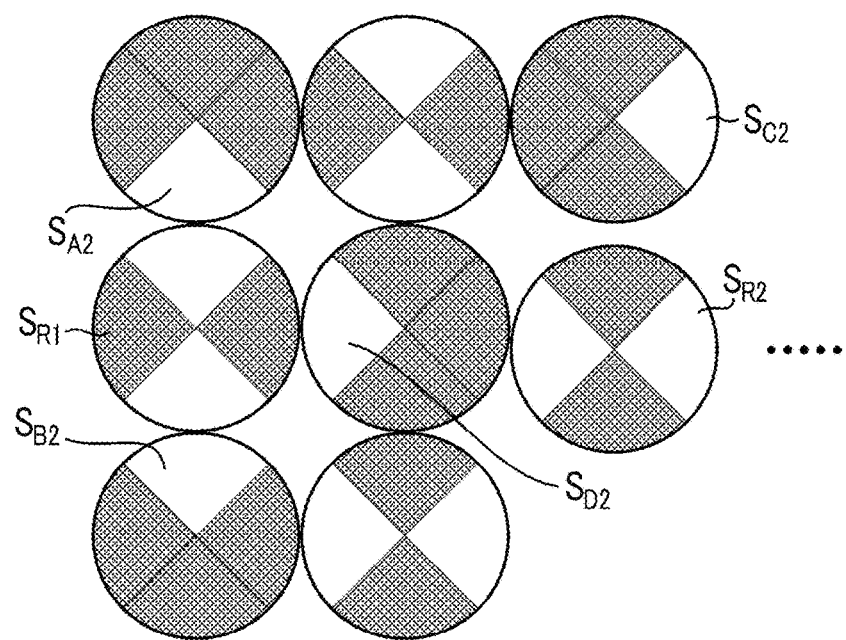
FIG. 13 is a front view of an essential part of an image sensor 16-3 according to a third embodiment.

FIG. 13 is a front view of an essential part of an image sensor 16-3 according to a third embodiment.

The image sensor 16-3 according to the third embodiment shown in FIG. 13 is a modification example of the second embodiment shown in FIG. 11. A first reference pixel $S_{R1}$ in which the first pixel $S_{A2}$ and the second pixel $S_{B2}$ are integrated without pupil division and a second reference pixel $S_{R2}$ in which the third pixel $S_{C2}$ and the fourth pixel $S_{D2}$ are integrated without pupil division are disposed in a mixed manner, in addition to the first pixel $S_{A2}$, the second pixel $S_{B2}$, the third pixel $S_{C2}$, and the fourth pixel $S_{D2}$.

With the image sensor 16-3 according to the third embodiment, in a case where the first symmetric image and the second symmetric image having the symmetric blurs are created, it is not necessary to add the first pixel $S_{A2}$ and the second pixel $S_{B2}$ or to add the third pixel $S_{C2}$ and the fourth pixel $S_{D2}$ for the generation. It is possible to acquire the third image and the fourth image having the symmetric blurs from the first reference pixel $S_{R1}$ and the second reference pixel $S_{R2}$.

<Second Embodiment of Imaging Lens>

Figure 14:
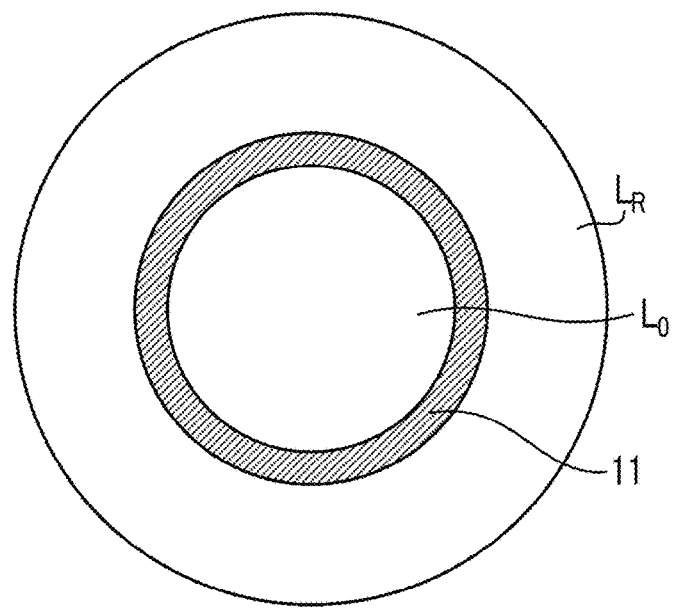
FIG. 14 is a front view of a second embodiment of an imaging lens 12-2.

FIG. 14 is a front view of a second embodiment of an imaging lens 12-2.

The imaging lens 12-2 shown in FIG. 14 has two areas of a first region consisting of a central optical system $L_O$ and a second region consisting of an annular optical system $L_R$ of a peripheral portion of the central optical system $L_O$ which are respectively disposed on the same optical axis. A light shielding portion 11 is provided between the central optical system $L_O$ and the annular optical system $L_R$.

The imaging lens 12-2 is the bifocal imaging lens having different focusing distances between the central optical system $L_O$ and the annular optical system $L_R$. A ring-shaped light shielding portion 11 is provided between the central optical system $L_O$ and the annular optical system $L_R$.

<Fourth Embodiment of Image Sensor>

Figure 15:
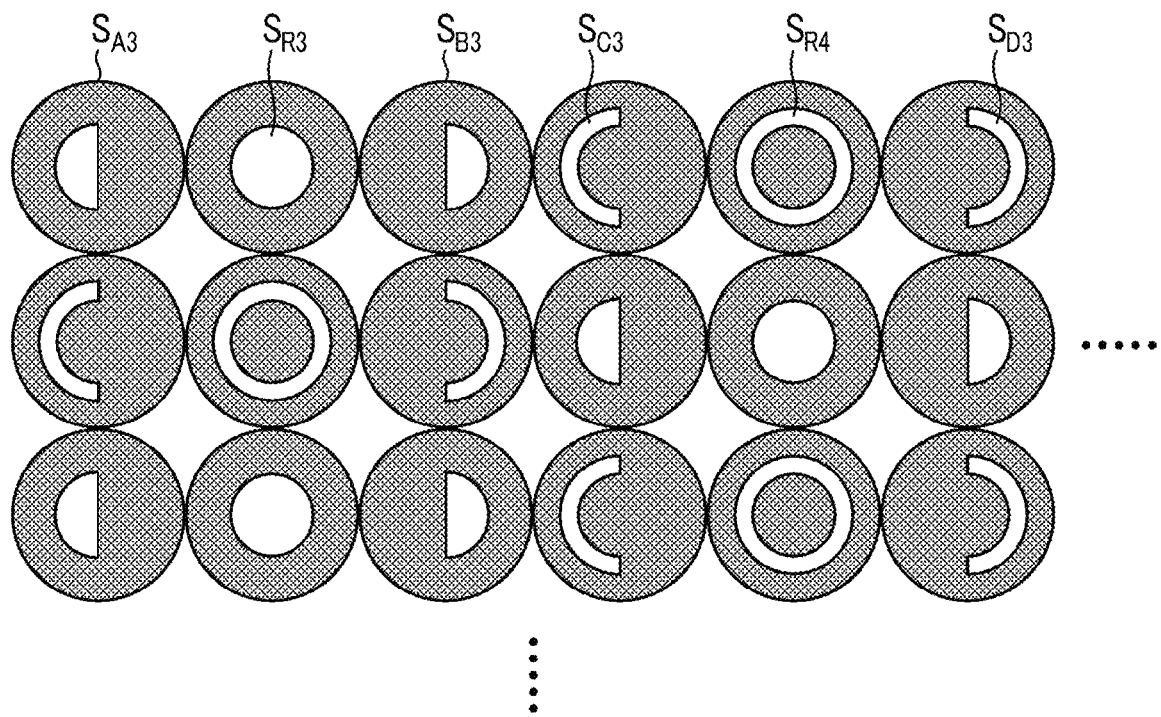
FIG. 15 is a plan view of a fourth embodiment of the image sensor.

FIG. 15 is a plan view of a fourth embodiment of the image sensor, and particularly an image sensor applied to the imaging lens 12-2 according to the second embodiment shown in FIG. 14.

An image sensor 16-4 according to the fourth embodiment shown in FIG. 15 employs the light-shielding mask system using the light-shielding mask as the pupil division unit and is provided with six kinds of light-shielding masks for pupil division forming a first aperture, a second aperture, a third aperture, a fourth aperture, a fifth aperture, and a sixth aperture respectively having different aperture positions and shapes.

The luminous flux passing through the central optical system $L_O$ of the imaging lens 12-2 is pupil-divided in the left-right direction by the light-shielding mask in which the first aperture and the second aperture are formed and is incident onto a first pixel $S_{A3}$ and a second pixel $S_{B3}$. The luminous flux passing through the annular optical system $L_R$ of the imaging lens 12-2 is pupil-divided in the left-right direction by the light-shielding mask in which the third aperture and the fourth aperture are formed and is incident onto a third pixel $S_{C3}$ and a fourth pixel $S_{D3}$.

The luminous flux passing through the central optical system $L_O$ of the imaging lens 12-2 is incident on a first reference pixel $S_{R3}$ by the light-shielding mask in which the fifth aperture is formed. The luminous flux passing through the annular optical system $L_R$ of the imaging lens 12-2 is incident on a second reference pixel $S_{R4}$ by the light-shielding mask in which the sixth aperture is formed.

<Apodizing Filter>

Figure 16:
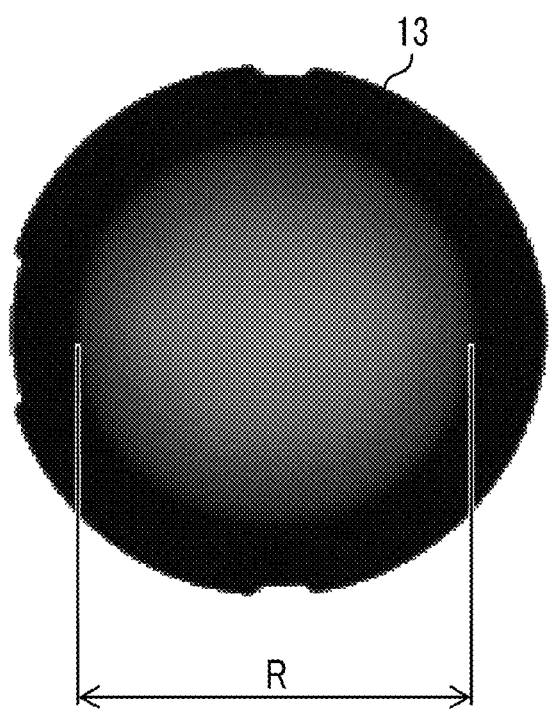
FIG. 16 is a front view of an apodizing filter 13.

FIG. 16 is a front view of an apodizing filter 13, which has an effective range R corresponding to the outer diameter of the imaging lens 12.

Figure 17:
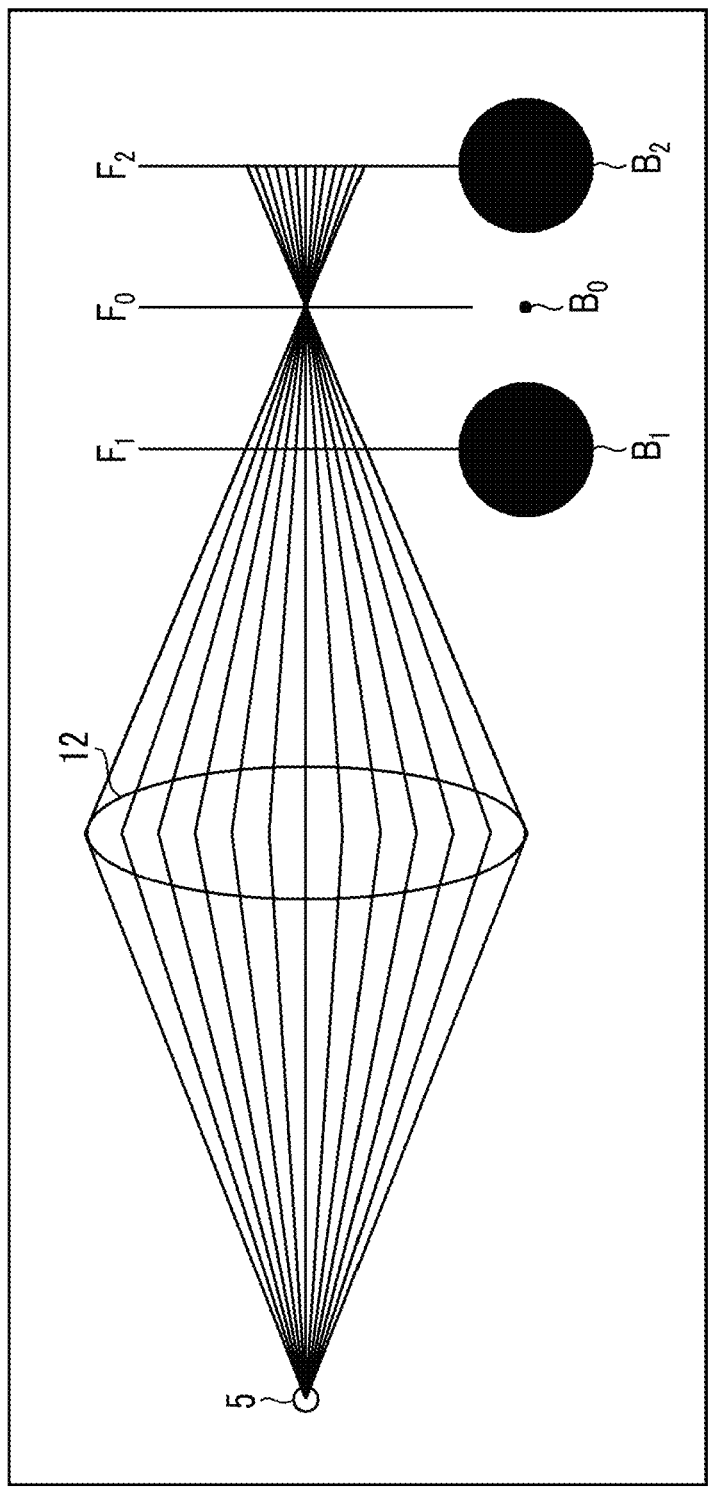
FIG. 17 is a diagram showing blurred images of a point light source 5 according to the distance to the subject.

FIG. 17 is a diagram showing blurred images of a point light source 5 according to the distance to the subject.

In FIG. 17, in a case where a distance of the point light source 5 is at the focusing distance of the imaging lens 12, the smallest point image (blurred image) $B_0$ is obtained at a focusing position $F_0$. In a case where the distance of the point light source 5 is at a distance corresponding to a front focus $F_1$ or a distance corresponding to a rear focus $F_2$ as compared with the focusing distance of the imaging lens 12, blurred images $B_1$ and $B_2$ having sizes according to the distance from the focusing distance are obtained.

The blurred images $B_1$ and $B_2$ have different sizes according to the distance from the focusing distance. However, a brightness distribution of the blurred images tends to be distributed like a table instead of being distributed like a normal distribution.

Figure 18:
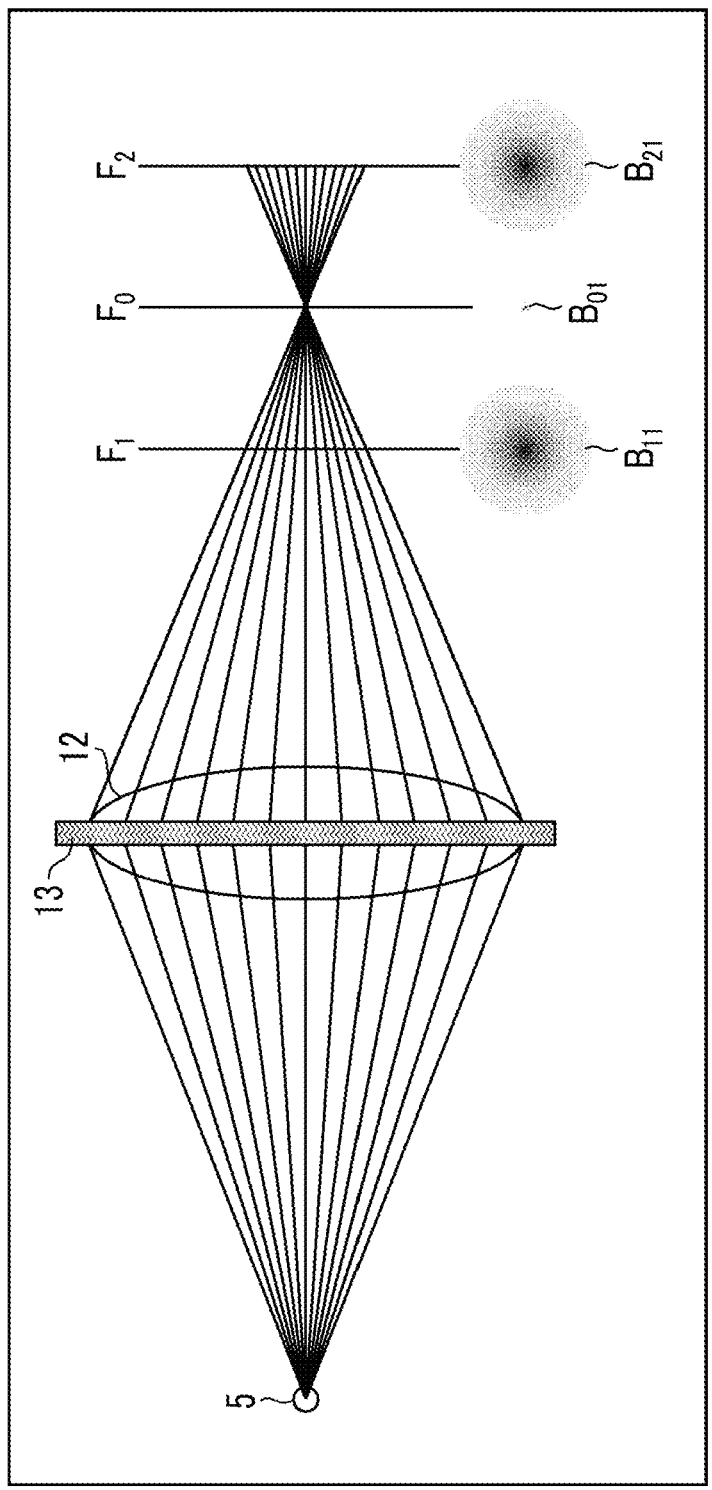
FIG. 18 is a diagram showing blurred images of the point light source 5 according to the distance to the subject in a case where the apodizing filter 13 is provided on the imaging lens 12.

As shown in FIG. 18, the imaging lens 12 is provided with the apodizing filter 13 shown in FIG. 16.

The apodizing filter 13 is an optical filter that continuously changes light transmittance from the center of the optical axis of the imaging lens 12 toward the peripheral portion. The apodizing filter 13 in this example is a reverse bullseye type optical filter whose light transmittance decreases from the central portion toward the peripheral portion.

The imaging lens 12 is provided with the apodizing filter 13, and thus it is possible to positively change a density distribution of the blurred images $B_1$ and $B_2$ from the center to the periphery. Accordingly, it is possible to clarify the shape (asymmetry) of the asymmetric blur in the first image and the second image and the shape (symmetry) of the symmetric blur in the third image and the fourth image and thus to improve distance estimation accuracy.

Examples of the apodizing filter include a bullseye type in which the light transmittance increases from the central portion toward the peripheral portion and the reverse bullseye type in this example in which the light transmittance decreases from the central portion toward the peripheral portion, and any type may be used.

[Distance Measurement Method]

Figure 19:
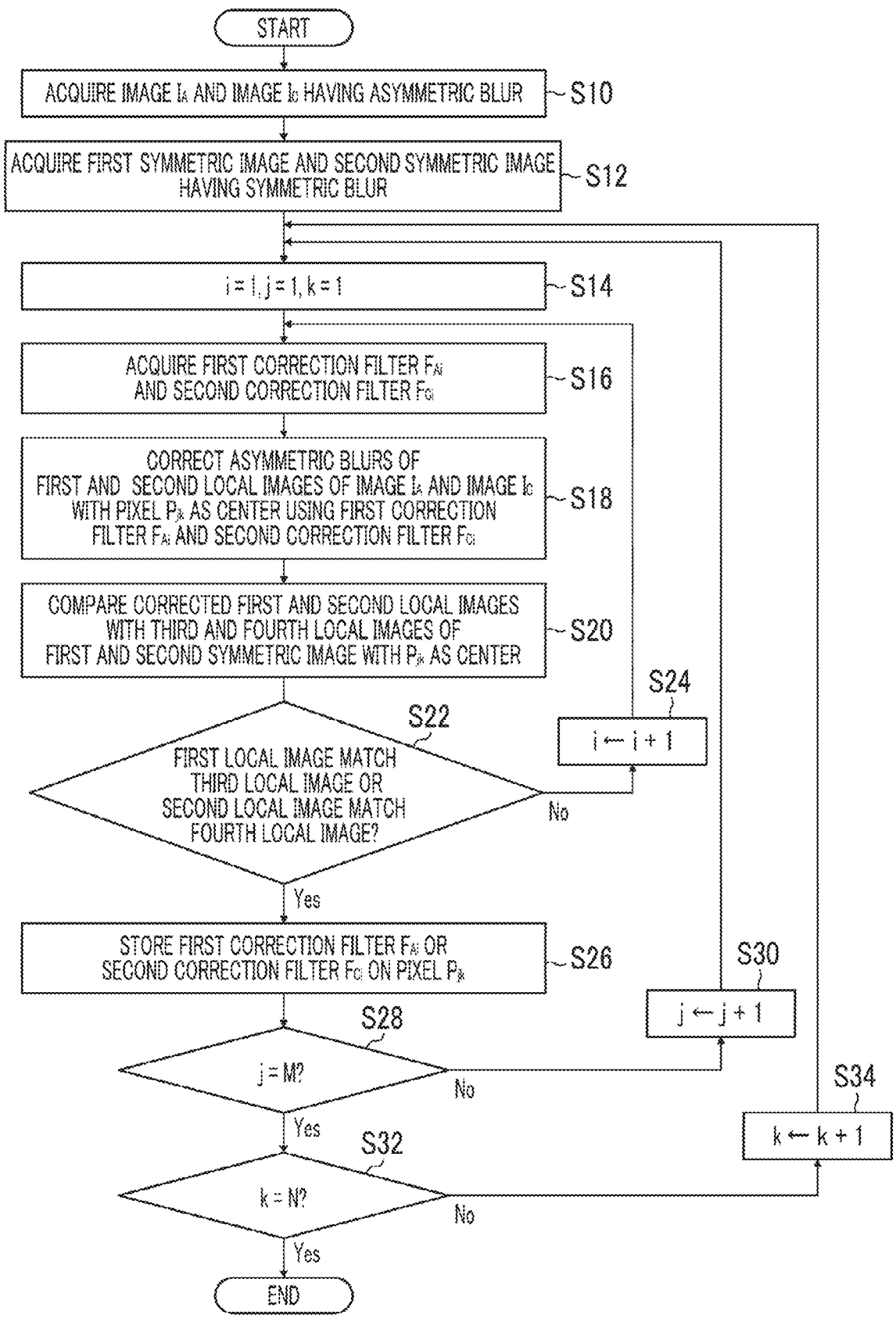
FIG. 19 is a flowchart showing an embodiment of a distance measurement method according to the present invention.

FIG. 19 is a flowchart showing an embodiment of the distance measurement method according to the present invention. The distance measurement operation by the CPU 40 having the functions of the respective units shown in FIG. 6 will be mainly described below.

In FIG. 19, the CPU 40 acquires the first image (image $I_A$) consisting of the first pixel group 22A of the first pixel group 22A and the second pixel group 22B captured by the image sensor 16, and the second image (image $I_C$) consisting of the third pixel group 22C of the third pixel group 22C and the fourth pixel group 22D captured by the image sensor 16 (step S10).

The CPU 40 acquires the third image (first symmetric image) in which the pixel values of the pair of first pixel $S_A$ and second pixel $S_B$ respectively corresponding to the first pixel group 22A and the second pixel group 22B are added, and the fourth image (second symmetric image) in which the pixel values of the pair of third pixel $S_C$ and fourth pixel $S_D$ respectively corresponding to the third pixel group 22C and the fourth pixel group 22D are added (step S12).

The images $I_A$ and $I_C$ are images having the asymmetric blurs, and the first and second symmetric images are images having the symmetric blurs. The image sensor 16-3 shown in FIG. 13 may be used instead of the image sensor 16 shown in FIG. 5. In a case where the image sensor 16-3 is used, an image (third image) having the symmetric blur consisting of the pixel group corresponding to the first reference pixel $S_{R1}$ of the image sensor 16-3 is acquired instead of the third image (first symmetric image) generated by adding the pixel values of the first pixel $S_A$ and the second pixel $S_B$, and an image (fourth image) having the symmetric blur consisting of the pixel group corresponding to the second reference pixel $S_{R2}$ of the image sensor 16-3 is acquired instead of the fourth image (second symmetric image) generated by adding the pixel values of the third pixel $S_C$ and the fourth pixel $S_D$.

Next, a parameter i specifying the first correction filter $F_{Ai}$ and the second correction filter $F_{Ci}$ is set to 1, and parameters j and k specifying a pixel $P_{jk}$ in the image $I_A$ are set to 1 (step S14). A pixel $P_{11}$ indicates a pixel at the upper left corner in the image, and a pixel $P_{MN}$ indicates a pixel at the lower right corner in the image.

Subsequently, the CPU 40 acquires the first correction filter $F_{Ai}$ and the second correction filter $F_{Ci}$ from the first correction filter storage unit 45-1D and the second correction filter storage unit 45-2D (step S16). The parameter i changes in a range of 1≤P≤Q, the second correction filter $F_{Ci}$ is a correction filter that repairs the asymmetric blur of the subject corresponding to the shortest distance within a measurable range, a second correction filter $F_{CP}$ is a correction filter corresponding to the maximum subject distance in the second correction filter $F_{Ci}$, a first correction filter $F_{A(P+1)}$ is a correction filter corresponding to a next subject distance of the second correction filter $F_{CP}$, and a first correction filter $F_{AQ}$ is a correction filter corresponding to the maximum subject distance within the measurable range.

The CPU 40 performs the convolution operation on the first local image of the image $I_A$ with the pixel $P_{jk}$ as a center and the first correction filter $F_{Ai}$ to correct the asymmetric blur of the first local image, or performs the convolution operation on the second local image of the image $I_C$ with the pixel $P_{jk}$ as a center and the second correction filter $F_{Ci}$ to correct the asymmetric blur of the second local image (step S18). In a case of 1≤i≤P, the convolution operation is performed on the second local image of the image $I_C$ and the second correction filter $F_{Ci}$ to correct the asymmetric blur of the second local image. In a case of P+1≤i≤Q, the convolution operation is performed on the first local image of the image $I_A$ and the first correction filter $F_{Ai}$ to correct the asymmetric blur of the first local image.

The corrected first local image is compared with the third local image with the pixel $P_{jk}$ of the first symmetric image as a center to obtain an evaluation value indicating a correlation between the two images, or the corrected second local image is compared with the fourth local image with the pixel $P_{jk}$ of the second symmetric image as a center to obtain an evaluation value indicating a correlation between the two images (step S20).

Determination is made whether or not the corrected first local image and the third local image match (the correlation between the two images is maximized), or the corrected second local image and the fourth local image match (the correlation between the two images is maximized), from the evaluation values (step S22). In a case where the images do not match, the parameter i is incremented by 1 (step S24), and the processing returns to step S16. Accordingly, the first correction filter $F_{Ai}$ and the second correction filter $F_{Ci}$ are sequentially changed, and the processing from step S16 to step S24, which are the first search step and the second search step, are repeated. That is, the first correction filter $F_{Ai}$ that corrects the first local image having the asymmetric blur to the third local image having the symmetric blur, or the second correction filter $F_{Ci}$ that corrects the second local image having asymmetric blur to the fourth local image having the symmetric blur is searched.

In a case where determination is made in step S22 that the two images match each other, the first correction filter $F_{Ai}$ or the second correction filter $F_{Ci}$ at the time in a case where the two images match (the distance to the subject corresponding to the first correction filter $F_{Ai}$ or the second correction filter $F_{Ci}$) is stored in association with a position of the pixel $P_{jk}$ (step S26). It corresponds to the first distance calculation step and the second distance calculation step of steps S16 to S26.

In a case where the distance calculation for each pixel ends, determination is subsequently made whether or not the parameter j matches M (step S28). The M is the number of pixels in the x direction of the images $I_A$ and $I_C$.

In a case where j M is determined in step S28, the parameter j is incremented by 1 (step S30), and the processing returns to step S14. Accordingly, it is shifted to the distance measurement at a pixel obtained by moving the position of the pixel $P_{jk}$ by one pixel in the x direction.

In a case where j=M is determined in step S28, the processing proceeds to step S32. In step S32, determination is made whether or not the parameter k matches N. The N is the number of pixels in the y direction of the images $I_A$ and $I_C$.

In a case where j≠N is determined in step S32, the parameter k is incremented by 1 (step S34), and the processing returns to step S14. Accordingly, it is shifted to the distance measurement at a pixel obtained by moving the position of the pixel $P_{jk}$ by one pixel in the y direction.

In a case where j=N is determined in step S32, the distance measurement for each pixel corresponding to all the pixels of the images $I_A$ and $I_C$ ends. Therefore, the processing of this distance measurement ends.

[Other]

The imaging device 10 according to the present embodiment can measure the distance to the subject that can be used to generate the distance map indicating the distance distribution of the subject in the imaging range and can capture and record a color image in the same imaging range. However, an imaging device dedicated to distance measurement of the subject may be employed in which a monochrome image in the same imaging range is captured and recorded or in which an image for recording is not captured. It is possible to use the imaging device 10 as an in-vehicle camera to use a distance map that can be generated as a part of an autonomous driving system or the like, or to mount the imaging device 10 on a drone to use a distance map that can be generated for flight control of the drone.

In the present embodiment, the stop at the time of capturing the image for creating the distance map is the fixed stop set in advance, but the aperture diameter (stop value) of the stop may be randomly changed. In this case, the blurred shape changes according to the stop value. Therefore, it is conceivable to prepare the first and second correction filters or expand or contract the first and second correction filters according to the stop value.

In the present embodiment, for example, a hardware structure of a processing unit that executes various types of processing such as the CPU 40 is the following various processors. The various processors include the CPU which is a general-purpose processor that executes software (program) to function as various processing units, a programmable logic device (PLD) which is a processor whose circuit configuration is changeable after manufacturing such as a field-programmable gate array (FPGA), a dedicated electric circuit which is a processor having a circuit configuration exclusively designed to execute specific processing such as an application specific integrated circuit (ASIC), and the like.

One processing unit may be configured by one of the various types of processors or may be configured by two or more processors of the same type or different types (for example, a combination of a plurality of FPGAs or a combination of a CPU and an FPGA). A plurality of processing units may be configured by one processor. As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a systemon-chip (SoC) or the like. As described above, the various processing units are configured using one or more of the various processors as the hardware structure.

Further, the hardware structure of the various processors is, more specifically, a circuitry combining circuit elements such as semiconductor elements.

Furthermore, the present invention includes a distance measurement program that is installed in a computer in the imaging device to function as the imaging device according to the present invention, and a recording medium in which the distance measurement program is recorded.

It is needless to say that the present invention is not limited to the above embodiments and various modifications can be made without departing from the spirit of the present invention.

EXPLANATION OF REFERENCES

10: imaging device
11: light shielding portion
12, 12-2: Imaging lens
13: apodizing filter
16, 16-2, 16-3, 16-4: image sensor
16A: microlens
19: flash light emitting unit
20: viewfinder window
21: A/D converter
22: image input controller
22A: first pixel group
22B: second pixel group
22C: third pixel group
22D: fourth pixel group
24: digital signal processing unit
26: compression/expansion processing unit
28: video encoder
30: liquid crystal monitor
32: sensor control unit
38: operation unit
38-1: shutter button
40: CPU
41-1: first image acquisition unit
41-2: second image acquisition unit
43-1: third image acquisition unit
43-2: fourth image acquisition unit
44: AE detection unit
45-1: first distance calculation unit
45-1A: first filter processing unit
45-1B: first comparison unit
45-1C: first correction filter search unit
45-1D: first correction filter storage unit
45-2: second distance calculation unit
45-2A: second filter processing unit
45-2B: second comparison unit
45-2C: second correction filter search unit
45-2D: second correction filter storage unit
46: AF detection unit
48: memory
49: ROM
50: VRAM
52: media controller
54: memory card
AF: phase difference
$B_1$, $B_2$: blurred image
$B_A$, $B_{A1}$, $B_{A2}$, $B_{A3}$, $B_{A4}$, $B_B$, $B_C$, $B_D$: asymmetric blur
$B_R$, $B_{R1}$, $B_{R2}$: symmetric blur
$F_A$, $F_{Ai}$, $F_{Bi}$: first correction filter
$F_C$, $F_{Ci}$, $F_{Di}$: second correction filter $I_A$, $I_B$, $I_C$, $I_D$: image
$L_A$: first sub-region
$L_B$: second sub-region
$L_C$: third sub-region
$L_D$: fourth sub-region
$L_O$: central optical system
$L_R$: annular optical system
S10 to S34: step
$S_A$, $S_{A2}$, $S_{A3}$: first pixel
$S_B$, $S_{B2}$, $S_{B3}$: second pixel
$S_C$, $S_{C2}$, $S_{C3}$: third pixel
$S_D$, $S_{D2}$, $S_{D3}$: fourth pixel
$S_{R1}$, $S_{R3}$: first reference pixel
$S_{R2}$, $S_{R4}$: second reference pixel

What is claimed is:

1. An imaging device comprising:
a multifocal imaging lens having different focusing distances in a first region and a second region;
an image sensor having a plurality of pixels formed of photoelectric conversion elements arranged two-dimensionally and having a first pixel and a second pixel that respectively pupil-divide and selectively receive luminous flux incident through the first region of the imaging lens and a third pixel and a fourth pixel that respectively pupil-divide and selectively receive luminous flux incident through the second region of the imaging lens;
a processor, configured to:
acquire a first image having an asymmetric blur from at least one pixel of the first pixel or the second pixel of the image sensor;
acquire a second image having an asymmetric blur from at least one pixel of the third pixel or the fourth pixel of the image sensor;
add pixel values of adjacent pixels of the first pixel and the second pixel of the image sensor to acquire a third image having a symmetric blur;
add pixel values of adjacent pixels of the third pixel and the fourth pixel of the image sensor to acquire a fourth image having a symmetric blur;
calculate a distance to a subject in an image based on the acquired first image and third image; and
calculate a distance to a subject in an image based on the acquired second image and fourth image.

2. An imaging device comprising:
a multifocal imaging lens having different focusing distances in a first region and a second region;
an image sensor having a plurality of pixels formed of photoelectric conversion elements arranged two-dimensionally and having a first pixel that pupil-divides and receives luminous flux incident through the first region of the imaging lens, a third pixel that pupil-divides and receives luminous flux incident through the second region of the imaging lens, a first reference pixel that does not pupil-divide and receives luminous flux incident through the first region of the imaging lens, and a second reference pixel that does not pupil-divide and receives luminous flux incident through the second region of the imaging lens;
a processor, configured to:
acquire a first image having an asymmetric blur from the first pixel of the image sensor;
acquire a second image having an asymmetric blur from the third pixel of the image sensor;
acquire a third image having a symmetric blur from the first reference pixel of the image sensor;

acquire a fourth image having a symmetric blur from the second reference pixel of the image sensor;

calculate a distance to a subject in an image based on the acquired first image and third image; and calculate a distance to a subject in an image based on the acquired second image and fourth image.

3. The imaging device according to claim 2, wherein the image sensor has a second pixel that pupil-divides and receives luminous flux incident through the first region of the imaging lens and has a pupil division direction different from that of the first pixel, and a fourth pixel that pupil-divides and receives luminous flux incident through the second region of the imaging lens and has a pupil division direction different from that of the third pixel.

4. The imaging device according to claim 1, wherein the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and wherein, in the image sensor, one microlens is disposed in four of the first pixel, the second pixel, the third pixel, and the fourth pixel which are adjacent to each other in the first direction and the second direction of the imaging lens, and luminous flux incident through the first sub-region, the second sub-region, the third sub-region, and the fourth sub-region of the imaging lens is pupil-divided by the microlens and is incident on the first pixel, the second pixel, the third pixel, and the fourth pixel.

5. The imaging device according to claim 3, wherein the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and wherein, in the image sensor, one microlens is disposed in four of the first pixel, the second pixel, the third pixel, and the fourth pixel which are adjacent to each other in the first direction and the second direction of the imaging lens, and luminous flux incident through the first sub-region, the second sub-region, the third sub-region, and the fourth sub-region of the imaging lens is pupil-divided by the microlens and is incident on the first pixel, the second pixel, the third pixel, and the fourth pixel.

6. The imaging device according to claim 1, wherein the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and wherein, in the image sensor, four kinds of light-shielding masks for pupil division that form a first aperture, a second aperture, a third aperture, and a fourth aperture respectively having different aperture positions are provided in the first pixel, the second pixel, the third pixel, and the fourth pixel, and luminous flux incident through the first sub-region, the second sub-region, the third sub-region, and the fourth sub-region of the imaging lens is pupil-divided by the light-shielding masks and is incident on the first pixel, the second pixel, the third pixel, and the fourth pixel.

7. The imaging device according to claim 3, wherein the imaging lens has the first region consisting of a point-symmetrical first sub-region and second sub-region divided in a first direction of the imaging lens, and the second region consisting of a point-symmetrical third sub-region and fourth sub-region divided in a second direction orthogonal to the first direction of the imaging lens, and wherein, in the image sensor, four kinds of light-shielding masks for pupil division that form a first aperture, a second aperture, a third aperture, and a fourth aperture respectively having different aperture positions are provided in the first pixel, the second pixel, the third pixel, and the fourth pixel, and luminous flux incident through the first sub-region, the second sub-region, the third sub-region, and the fourth sub-region of the imaging lens is pupil-divided by the light-shielding masks and is incident on the first pixel, the second pixel, the third pixel, and the fourth pixel.

8. The imaging device according to claim 1, wherein the imaging lens has the first region consisting of a central optical system and the second region consisting of an annular optical system in a peripheral portion of the central optical system, which are respectively disposed on the same optical axis, and wherein, in the image sensor, four kinds of light-shielding masks for pupil division that form a first aperture, a second aperture, a third aperture, and a fourth aperture respectively having different aperture positions and shapes are provided in the first pixel, the second pixel, the third pixel, and the fourth pixel, and luminous flux incident through the central optical system of the imaging lens is pupil-divided by the light-shielding masks and is incident on the first pixel and the second pixel and luminous flux incident through the annular optical system of the imaging lens is pupil-divided by the light-shielding masks and is incident on the third pixel and the fourth pixel.

9. The imaging device according to claim 3, wherein the imaging lens has the first region consisting of a central optical system and the second region consisting of an annular optical system in a peripheral portion of the central optical system, which are respectively disposed on the same optical axis, and wherein, in the image sensor, four kinds of light-shielding masks for pupil division that form a first aperture, a second aperture, a third aperture, and a fourth aperture respectively having different aperture positions and shapes are provided in the first pixel, the second pixel, the third pixel, and the fourth pixel, and luminous flux incident through the central optical system of the imaging lens is pupil-divided by the light-shielding masks and is incident on the first pixel and the second pixel and luminous flux incident through the annular optical system of the imaging lens is pupil-divided by the light-shielding masks and is incident on the third pixel and the fourth pixel.

10. The imaging device according to claim 1, wherein a plurality of color filters including three color filters of three primary colors are disposed in a predetermined filter array in each pixel of the plurality of pixels of the image sensor, and wherein the first image and the second image as well as the third image and the fourth image are images acquired from pixels in which the color filters of the same color are disposed, respectively.

11. The imaging device according to claim 1,
wherein the processor corrects an asymmetric blur of a first local image in a local region of the first image to a symmetric blur using a first correction filter and compares the first local image corrected by the first correction filter with a third local image in a local region of the third image, which is in the same local region as the first local image, to search for the first correction filter in a case where a correlation between the compared first local image and third local image is maximized, and calculates a distance of the local region which is the distance to the subject based on the searched first correction filter, and
wherein the processor corrects an asymmetric blur of a second local image in a local region of the second image to a symmetric blur using a second correction filter and compares the second local image corrected by the second correction filter with a fourth local image in a local region of the fourth image, which is in the same local region as the second local image, to search for the second correction filter in a case where a correlation between the compared second local image and fourth local image is maximized, and calculates a distance of the local region which is the distance to the subject based on the searched second correction filter.

12. The imaging device according to claim 11, further comprising
a memory that stores a plurality of the first correction filters having different filter sizes and filter coefficients according to the distance to the subject and stores a plurality of the second correction filters having different filter sizes and filter coefficients according to the distance to the subject,
wherein the processor reads one first correction filter of the plurality of first correction filters stored in the memory and performs a convolution operation between the first local image and the read first correction filter to generate the first local image corrected by the first correction filter,
wherein the processor searches for the first correction filter in a case where the correlation is maximized from among the plurality of first correction filters stored in the memory,
wherein the memory further stores a plurality of the second correction filters having different filter sizes and filter coefficients according to the distance to the subject,
wherein the processor reads one second correction filter of the plurality of second correction filters stored the memory and performs a convolution operation between the second local image and the read second correction filter to generate the second local image corrected by the second correction filter, and
wherein the processor searches for the second correction filter in a case where the correlation is maximized from among the plurality of second correction filters stored in the memory.

13. The imaging device according to claim 1, wherein the processor is further configured to:
select one distance to the subject of the distance to the subject calculated based on the acquired first image and third image and the distance to the subject calculated based on the acquired second image and fourth image, as a distance to the subject in the image.

14. The imaging device according to claim 1,
wherein an apodizing filter that continuously changes light transmittance from an optical axis center of the imaging lens toward a peripheral portion is provided.

15. A distance measurement method by an imaging device including a multifocal imaging lens having different focusing distances in a first region and a second region and an image sensor having a plurality of pixels formed of photoelectric conversion elements arranged two-dimensionally and having a first pixel and a second pixel that respectively pupil-divide and selectively receive luminous flux incident through the first region of the imaging lens and a third pixel and a fourth pixel that respectively pupil-divide and selectively receive luminous flux incident through the second region of the imaging lens, the method comprising:
acquiring a first image having an asymmetric blur from at least one pixel of the first pixel or the second pixel of the image sensor;
acquiring a second image having an asymmetric blur from at least one pixel of the third pixel or the fourth pixel of the image sensor;
adding pixel values of adjacent pixels of the first pixel and the second pixel of the image sensor to acquire a third image having a symmetric blur;
adding pixel values of adjacent pixels of the third pixel and the fourth pixel of the image sensor to acquire a fourth image having a symmetric blur;
calculating a distance to a subject in an image based on the acquired first image and third image; and
a distance to a subject in an image based on the acquired second image and fourth image.

16. A distance measurement method by an imaging device including a multifocal imaging lens having different focusing distances in a first region and a second region and an image sensor having a plurality of pixels formed of photoelectric conversion elements arranged two-dimensionally and having a first pixel that pupil-divides and receives luminous flux incident through the first region of the imaging lens, a third pixel that pupil-divides and receives luminous flux incident through the second region of the imaging lens, a first reference pixel that does not pupil-divide and receives luminous flux incident through the first region of the imaging lens, and a second reference pixel that does not pupil-divide and receives luminous flux incident through the second region of the imaging lens, the method comprising:
acquiring a first image having an asymmetric blur from the first pixel of the image sensor;
acquiring a second image having an asymmetric blur from the third pixel of the image sensor;
acquiring a third image having a symmetric blur from the first reference pixel of the image sensor;
acquiring a fourth image having a symmetric blur from the second reference pixel of the image sensor;
calculating a distance to a subject in an image based on the acquired first image and third image; and
calculating a distance to a subject in an image based on the acquired second image and fourth image.

17. The distance measurement method according to claim 15,
wherein calculating the distance to the subject in the image based on the acquired first image and third image includes:
correcting an asymmetric blur of a first local image in a local region of the first image to a symmetric blur using a first correction filter;
comparing the first local image corrected by the first correction filter with a third local image in a local region of the third image, which is in the same local region as the first local image, to search for the first correction filter in a case where a correlation between the compared first local image and third local image is maximized; and calculating a distance of the local region which is the distance to the subject based on the searched first correction filter, and wherein calculating the distance to the subject in the image based on the acquired second image and fourht image includes:

correcting an asymmetric blur of a second local image in a local region of the second image to a symmetric blur using a second correction filter; and comparing the second local image corrected by the second correction filter with a fourth local image in a local region of the fourth image, which is in the same local region as the second local image, to search for the second correction filter in a case where a correlation between the compared second local image and fourth local image is maximized; and calculating a distance of the local region which is the distance to the subject based on the searched second correction filter.

18. The distance measurement method according to claim 16, wherein calculating the disance to the subject in the image based on the acquired first image and third image includes:

correcting an asymmetric blur of a first local image in a local region of the first image to a symmetric blur using a first correction filter;

comparing the first local image corrected by the first correction filter with a third local image in a local region of the third image, which is in the same local region as the first local image, to search for the first correction filter in a case where a correlation between the compared first local image and third local image is maximized; and calculating a distance of the local region which is the distance to the subject based on the searched first correction filter, and wherein calculating the distance to the subject in the image based on the acquired second image and fourth image includes:

correcting an asymmetric blur of a second local image in a local region of the second image to a symmetric blur using a second correction filter;

comparing the second local image corrected by the second correction filter with a fourth local image in a local region of the fourth image, which is in the same local region as the second local image, to search for the second correction filter in a case where a correlation between the compared second local image and fourth local image is maximized; and calculating a distance of the local region which is the distance to the subject based on the searched second correction filter.

19. The distance measurement method according to claim 17, wherein calculating the distance to the subject in the image based on the acquired first image and third image includes:

reading one first correction filter of the plurality of first correction filters from a memory that stores a plurality of the first correction filters having different filter sizes and filter coefficients according to the distance to the subject;

performing a convolution operation between the first local image and the read first correction filter to generate the first local image corrected by the first correction filter, searching for the first correction filter in a case where the correlation is maximized from among the plurality of first correction filters stored in the memory, wherein calculating the distance to the subject in the image based on the acquired second image and fourth image includes:

reading one second correction filter of the plurality of second correction filters from the memory that further stores a plurality of the second correction filters having different filter sizes and filter coefficients according to the distance to the subject;

performing a convolution operation between the second local image and the read second correction filter to generate the second local image corrected by the second correction filter; and searching for the second correction filter in a case where the correlation is maximized from among the plurality of second correction filters stored in the memory.

20. A recording medium in which a distance measurement program causing a computer to execute the distance measurement method according to claim 15 is recorded.

21. A recording medium in which a distance measurement program causing a computer to execute the distance measurement method according to claim 16 is recorded.

* * * * *